United States Patent
Peterffy et al.

(10) Patent No.: US 11,354,736 B2
(45) Date of Patent: Jun. 7, 2022

(54) ELECTRONIC TRADING SYSTEM UTILIZING USER-CUSTOMIZED IMPLIED PROBABILITY DISTRIBUTIONS AND GRAPHICAL USER INTERFACE FOR SAME

(71) Applicant: INTERACTIVE BROKERS LLC, Greenwich, CT (US)

(72) Inventors: Thomas Pechy Peterffy, Greenwich, CT (US); Eugene Balkovski, Stamford, CT (US); David Bowman, New Canaan, CT (US); Milan Galik, Darien, CT (US); Dennis Stetsenko, Riverside, CT (US)

(73) Assignee: Interactive Brokers LLC, Greenwich, CT (US)

( * ) Notice: Subject to any disclaimer, the term of this patent is extended or adjusted under 35 U.S.C. 154(b) by 997 days.

(21) Appl. No.: 14/527,620

(22) Filed: Oct. 29, 2014

(65) Prior Publication Data

US 2015/0120526 A1 Apr. 30, 2015

Related U.S. Application Data

(60) Provisional application No. 61/897,118, filed on Oct. 29, 2013.

(51) Int. Cl.
*G06Q 40/04* (2012.01)
*G07F 7/10* (2006.01)
(Continued)

(52) U.S. Cl.
CPC .................. *G06Q 40/04* (2013.01)

(58) Field of Classification Search
None
See application file for complete search history.

(56) References Cited

U.S. PATENT DOCUMENTS

| | | | |
|---|---|---|---|
| 7,225,153 B2* | 5/2007 | Lange | G06Q 40/00 705/35 |
| 7,236,953 B1* | 6/2007 | Cooper | G06Q 40/06 705/36 R |
| 2011/0066568 A1* | 3/2011 | Milne | G06Q 40/04 705/36 R |

FOREIGN PATENT DOCUMENTS

| | | |
|---|---|---|
| JP | 2016-552226 B2 | 11/2018 |
| WO | W2002/017120 A1 | 2/2002 |
| WO | 2009/134512 A1 | 11/2009 |

OTHER PUBLICATIONS

Tom Smith, "Option-implied probability distributions for future inflation", 2012, Bank of England Quarterly Bulletin, 2012 Q3, pp. 224-233 (Year: 2012).*

(Continued)

*Primary Examiner* — Ryan D Donlon
*Assistant Examiner* — Irene S Kang
(74) *Attorney, Agent, or Firm* — Brown Rudnick LLP; Ian G. DiBernardo

(57) ABSTRACT

Computer-implemented methods and systems, including a user interface, that (a) calculate and display a graphical representation of a market implied probability distribution for the future prices of a tradable asset, which is derived from real time prices of the options on the asset, (b) permit the user to customize the market implied probability distribution graph to reflect the user's own view on the probability that the future price of the asset will be within a price range, and (c) propose an optimal trading strategy implemented as a combination of option orders, which strategy is optimized to be profitable assuming the customized probability distribution (if any). The combination orders may be modified and/or added to by the user.

19 Claims, 17 Drawing Sheets

(51) Int. Cl.
G06Q 40/08 (2012.01)
G06Q 40/06 (2012.01)

(56) References Cited

OTHER PUBLICATIONS

Pat Neal, "Option Prices Imply A Probability Distribution", Nov. 11, 2005, www.globalcapital.com (Year: 2005).*
Extended European Search Report for EP Application No. 14800192.8 dated Apr. 7, 2017.
PCT International Search Report for PCT/US14/62978 dated Mar. 26, 2015.
Office Action dated Feb. 20, 2020 in Japanese Patent Application No. 2018-216279.
Communication pursuant to Article 94(3) EPC dated Nov. 9, 2018 in corresponding European Patent Application No. 14800192.8.

* cited by examiner

FIG. 4F

⊕ STRATEGY ADJUSTMENT / ORDER ENTRY

| | ACTION | RT | EXPIRY | STRIKE | TYPE | DELTA | BID/ASK | SIZE |
|---|---|---|---|---|---|---|---|---|
| XLEG 1 | SELL | 1 | DEC 20 '13 | 165.0 | PUT | -0.41 | 16.40 X 16.75 | 150 X 425 |
| XLEG 2 | SELL | 1 | DEC 20 '13 | 170.0 | CALL | 0.54 | 17.45 X 17.60 | 172 X 240 |
| XLEG 3 | BUY | 1 | DEC 20 '13 | 240.0 | CALL | 0.12 | 2.24 X 2.30 | 4 X 6 |
| TOTAL | | | | | | -0.01 | -32.06 X -31.55 | 4 X 6 |

ORDER ENTRY: [LMT ▽] QTY [1] [LMT] -31.54 CREDIT [DAY ▷] [ADVANCED ⊕]

⊕ STRAT
- LMT
- MKT
- REL + LMT — ONE OR BOTH LEGS ARE SUBMITTED AS REL. ONCE THE FIRST LEG TRADES, THE SECOND LEG IS SUBMITTED AS LMT. — 3070

PROBABILITY chart: 7.5%, 5%, 2.5%, 0%

P&L: 2.5K, 0, -2.5K, -5.0K

— DEC + 240 CALL - 165 PUT - 170 CALL   ☐ CUSTOM PROBABILITY

X-axis: 75 80 85 90 95 100 105 110 115 120 125 130 135 140 145 150 155 160 165 170 175 180 185 190 195 200 205 210 215 220 225 230 235 240 245 250 255 260 265 270 275 280 285

[SUBMIT]

FIG. 4G

⊕ STRATEGY ADJUSTMENT / ORDER ENTRY

| | ACTION | RT | EXPIRY | STRIKE | TYPE | DELTA | BID/ASK | SIZE |
|---|---|---|---|---|---|---|---|---|
| XLEG 1 | SELL | 1 | DEC 20 '13 | 165.0 | PUT | -0.41 | 16.45 X 16.60 | 32 X 3 |
| XLEG 2 | SELL | 1 | DEC 20 '13 | 170.0 | CALL | 0.55 | 17.55 X 17.85 | 68 X 3 |
| XLEG 3 | BUY | 1 | DEC 20 '13 | 240.0 | CALL | 0.12 | 2.28 X 2.35 | 37 X 6 |
| TOTAL | | | | | | -0.02 | -32.17 X -31.65 | 1 X 6 |

ORDER ENTRY: [LMT ▷] QTY [1] [LMT] -31.54 CREDIT [DAY ▽] [ADVANCED ⊕]
- DAY
- GTC  — 3080

[SUBMIT]

ELECTRONIC TRADING SYSTEM UTILIZING USER-CUSTOMIZED IMPLIED PROBABILITY DISTRIBUTIONS AND GRAPHICAL USER INTERFACE FOR SAME

CROSS-REFERENCE TO RELATED APPLICATIONS

This application claims the benefit under 35 U.S.C. Section 119(e) of U.S. Provisional Application Ser. No. 61/897,118, filed Oct. 29, 2013, which is hereby incorporated herein by reference in its entirety.

FIELD OF INVENTION

The present invention relates to electronic securities trading systems and, in particular, to computer-implemented systems for trading one or more financial products having graphical user interface displaying and customizing real time implied probability distributions of future prices of underlying assets of the financial products.

BACKGROUND

The price at which an option currently trades reflects the probability the market attaches to the option's underlying asset being within a range of possible prices at some future date. For example, the prices of put and call options on a stock are determined by the probability distribution of the price of such stock. However, despite the relationship between such probability distribution of the price of the underlying (e.g., stock) and the price of the financial product (e.g., option), no electronic trading system has heretofore provided users with an efficient tool for trading based on such probability distribution or, moreover, customizing such probability distributions and trading financial products based on such customized probability distributions.

SUMMARY

Advantages of the disclosed embodiments will be apparent from the description that follows, and through the practice of the disclosed subject matter. The systems and methods disclosed herein applies to options or other derivatives, and to underlying assets, such as stocks, exchange traded funds (ETFs), commodities, currencies and other underlyings. Embodiments of the present invention provide a user with a flexible, simple and efficient tool to graphically display a probability distribution of an underlying asset derived from the current markets prices, customize the market's probability distribution, for example, to reflect user's own estimate of the probability distribution, determine and present to the user one or more preferred trades of options or other derivatives of the underlying based on the customized probability distribution, and submit one or more preferred trades to an electronic marketplace. The preferred trades may be determined for the user based on optimizing the expected return assuming a probability density function ("PDF") based on the user's customized probability distribution.

In general, embodiments described herein include computer-implemented methods and systems, including a user interface, that (a) calculate and display a graphical representation of a market implied probability distribution for the future prices of a tradable asset, which is derived from real time prices of the options on the asset, (b) permit the user to customize the implied probability distribution graph to reflect the user's own view on the probability that the future price of the asset will be within a price range, and (c) propose an optimal strategy implemented as a combination of option (or other derivative or option orders with a stock leg) orders, which strategy is optimized to be profitable assuming the customized probability distribution (if any) is more accurate than the probability distribution derived from the market prices. In further embodiments, the systems and methods also: (d) allow the user to modify the legs of the proposed combination of orders, including adding one or more orders in the underlying, (e) present to the user a graphical representation of the potential profit and loss outcomes of the proposed (or modified) combination of orders, (f) present to the user a graphical representation of risk measurements related to the proposed (or modified) combination of orders, for example, including one or more of Delta, Gamma, Vega, Theta and Rho, and/or (g) directly submit the proposed (or modified) combination of orders to a market place. Furthermore, various optional features, including those described herein, may be utilized and/or presented to users.

BRIEF DESCRIPTION OF DRAWINGS

Embodiments of the invention will be described and shown in detail by way of example with reference to the accompanying drawings in which:

FIGS. 4A-4H are screen shots of the graphical user interface according to one embodiment of the present invention;

DETAILED DESCRIPTION OF EMBODIMENTS

While there are shown and described fundamental novel features of the invention as applied to the illustrative embodiments thereof, it is to be understood that omissions and substitutions and changes in the form, features and details of the disclosed embodiments of the invention may be made by those skilled in the art without departing from the spirit of the invention. In this regard, it should be understood that the embodiments herein are merely illustrative, and that various features and implementation details may be omitted, combined and interchanged (including from different embodiments) and/or modified, all without departing from the spirit of the invention.

Figure 1:
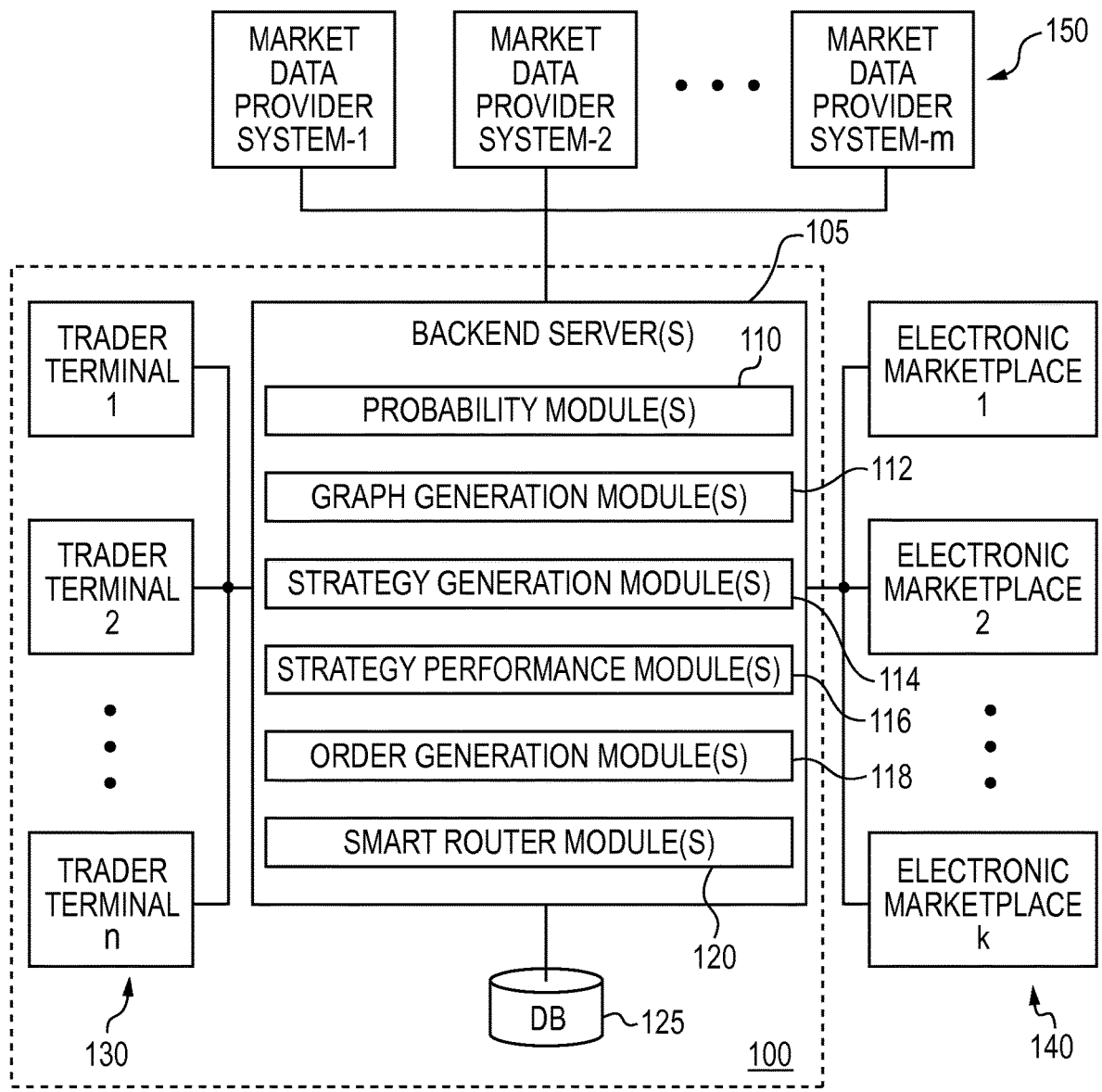
FIG. 1 is a schematic diagram of a computer-implemented trading network in accordance with an embodiment of the present invention.

As will be understood by those skilled in the art, embodiments of the present invention may be implemented using any number of different computer and/or network-based technologies. Turning first to FIG. 1, there is shown an embodiment of a computer-implemented trading system 100 generally comprising one or more backend servers 105 and workstations (1, 2, . . . n) 130. In general, the backend servers 105 serve as an intermediary between workstations 130 and electronic marketplaces (1, 2, . . . k) 140, receiving trade order details from the workstations 130, processing them, and submitting trade orders based thereon to the electronic marketplaces 140. The backend servers 105 also receive order execution information from the electronic marketplaces 140, process the execution information, and provide execution details to the workstations 130. In performing such functions, the backend servers 105 also receive and utilize market data, such as current market prices for securities, received from market data provider systems (1, 2, . . . m) 150.

The present embodiment is directed to options on stocks although alternate embodiments made be applicable to other financial products and underlyings. Accordingly, the electronic marketplaces 140 may include any market or exchange for the trading of securities, such as that provided by the New York Stock Exchange Euronext, Boston Options Exchange, Chicago Mercantile Exchange (CME), Nasdaq, New York Mercantile Exchange, FTSE, Electronic Communications Networks (ECNs), liquidity pools, such as those operated by POSIT and LIQUIDNET, and others.

In providing the functions described herein, the backend servers 105 include processors that operate in accordance with software, firmware or other computer program stored on a computer readable medium, such as read only memory, hard disks (e.g., in a RAID configuration), tape drives, flash memories, optical disks, network storage or other known or hereafter developed technology. The servers 105 (and the processors thereof) may be configured to operate in accordance with software (computer readable instructions), which may be configured or organized to comprise various functional components or modules. In addition to components of electronic trading systems and communication systems generally known to those skilled in the art, the servers 105 may include specialized engines or modules (e.g., implemented as software or firmware modules), such as: probability module(s) 110 for generating the probabilities and probability distribution function described herein; graph-generation module(s) 112 for generating and modifying the graphs described herein; preferred strategy generation module(s) 114 to generate and/or identify one or more preferred strategies in response to user inputs and market data; strategy performance module(s) 116 to determine and display the performance of strategies identified by the system 100 (as may be modified by a user); and strategy order generation module(s) 118 to generate the electronic orders comprising the selected strategy (as may be modified by the user). The servers 105 may also include smart router module(s) 120 to route the electronic orders to the electronic marketplaces 140.

In performing the functions and operations described herein, servers 105 may also access records and data in computer memory, such as random access memory, hard disks (e.g., in a RAID configuration), tape drives, flash memories, optical disks, network storage or other known or hereafter developed technology. By way of example, backend servers 105 include or are in communication with electronic database 125. As will be apparent to those skilled in the art based on the description herein, database 125 may comprise a relational database having multiple related tables. In certain embodiments, for example, database 125 stores data typically stored in electronic trading systems, as well as the information used in providing the trading described herein, and may include an account table, marketplace tables, a positions table and an order table.

In general, the account table stores information that identifies each market participant account, as identified by a unique account identifier (ID), and the associated market participant, including, for example, contact information, bank information, trading limits and any other information deemed relevant, as well as an indication of the users (and the associated workstations 130) trading under each account. For example, the system 100 may store limits restricting users to trade in specific marketplaces and/or at specific times. Each workstation 130 may be identified by a unique terminal ID and/or Internet protocol (IP) address, and each user may be identified by a unique user name and/or password, which the user uses to log into the workstation 130 and/or system 100. The backend servers 105 may use the terminal ID and the user name/password to identify and associate incoming orders as being transmitted by a particular workstation 130 and/or user, to process orders and to send outgoing messages to the appropriate workstation 130. The account holders and users may include, for example, retail and individual investors, institutional investors, banks, market-makers, broker-dealers, or other entities.

One or more marketplace tables may include details regarding each of the marketplaces 150, as identified by unique marketplace ID, such as contact and routing information, trading schedule and other information.

The database 125 may also include one or more tables for storing account and user positions. Such tables may include an indication of the aggregate positions in each security for each user and account.

Database 125 may also include one or more tables for storing trade and order details, including associating each user with its trade strategies, and each trade strategy with its component orders. For example, the database 125 may include a user or account table, which associates users and/or accounts with strategies (as identified by unique ID), and a strategy table, which associates each strategy with its orders (as identified by unique order ID). The same or one or more other tables may include the order parameters associated with each order. Such tables may also track order parameters not necessarily provided by the user, such as the status of each order (for example, whether it is open or filled or to be cancelled or revised) and the details associated with the placing of the order (for example, the particular electronic marketplace 140 on which the order is placed, the time of the order and other details).

It should be understood that the foregoing tables are merely illustrative, and that more or less information may be stored and tracked by the servers 105 and/or system 100 as may be desired. Furthermore, such data may be stored in any grouping and in any number of databases and/or tables, including storing any of the information remote from the servers 105, such as at the workstations 130. Additionally, rather than storing all information, certain information may be generated in real time based on other information available to the system 100.

It should also be recognized that the computer systems described herein, such as the workstations 130, servers 105, electronic marketplaces 140 and market data provider systems 150, generally include one or more computers that are programmatically structured or configured in accordance with computer instructions or code residing in non-transient memory, to perform the functions required to manage their operations, as described herein. One skilled in the art will recognize that the computer systems may, as a matter of design choice, include any number and configurations of discrete computers and electronic databases, which may be used separately or in tandem to support the traffic and processing needs necessary in operation at one time. In one embodiment, the backend servers 105, if multiple servers are used, are configured using a round-robin configuration to handle user and/or electronic marketplace. Although not depicted in the figures, the one or more computers of the computer systems generally include such components as are ordinarily found in such computer systems, including but not limited to processors, RAM, ROM, clocks, hardware drivers, associated storage, and the like.

In general, each workstation 130 may be a specially programmed general purpose computer, special-purpose computer or other computing device (such as a PDA, smartphone, tablet or other mobile device) that operates according to software, firmware or other program stored on a computer readable medium to provide the functions described herein. For example, each workstation 130 may be programmed to provide a number of graphical user interfaces (GUIs) to the users such that users can interact with and use the functions provided by system 100 and servers 105, as discussed in greater detail below. In the present embodiment, the workstation 130 is a Java-based GUI that packages information and transmits it to the servers 105 as an extension of the FIX protocol, and receives information from the servers 105. In certain embodiments the software or other programming residing in the computer readable medium at the workstation 130 provides the functionality otherwise provided by the servers 105; for example, that of one or more of the modules or presenting the user with the order tickets, receiving the user inputs, including the order parameters and conditions disclosed herein, evaluating the parameters and conditions, generating the component orders and transmitting them (e.g., in the FIX protocol) to the electronic marketplaces 140 and/or servers 105, and tracking the order progress in a local version of the database. In alternate embodiments, the GUI is generated by the backend servers, 105, for example, by an interface software component or module residing in memory. In such an embodiment, the backend server may further include a web server for providing the GUI and the system may operate generally as an application service provider (ASP).

Furthermore, each of the servers 105, workstations 130, electronic marketplaces 140 and market data provider systems 150 described herein may have a network connection over which each communicates with the other components as described herein. The network connection may be a gateway interface to the Internet or any other communications network through which the systems can communicate with other systems and user devices. The servers 105 may communicate with each of the other types of components over the same network, such as the Internet, or over separate networks, such as the Internet, WANs, LANs, VPNs or other communication link. Network connection may connect to the communications network through use of a conventional modem (at any known or later developed baud rate), an open line connection (e.g., digital subscriber lines or cable connections), satellite receivers/transmitters, wireless communication receivers/transmitters, or any other network connection device as known in the art now or in the future. It will be understood by those skilled in the art that the display of user interfaces and the provision or display of information to a user may be accomplished within the scope of the present invention in a number of ways, including, but not limited to, the serving or pushing of interfaces to a user, exposing one or more application programming interfaces (APIs) to the workstations 130, and the local storing and/or generation of interfaces at a workstation 130 upon a trigger received from the servers 105 or input from the user at the workstation 130. Also, the backend servers 105 may communicate with the workstations 130 and electronic marketplaces 140 using any protocol or format. In certain embodiments, the computer systems involved preferably communicate using a messaging system in which information be communicated is contained within one or more messages, which may be packetized, encrypted or formatted, as necessary to address specific bandwidth or security concerns. The messages may use XML or other message types and may be based off of one or more message standards, such as FIX in the financial industry, or be based on a proprietary protocol or format.

It will be understood that reference to a "connection," "communication" or "link" is not intended to mean that the various computers be in constant connection or communication, but rather be capable of communication upon establishment of a connection. For example, a workstation 130 may from time-to-time "connect" to servers 105 using an unsecured Internet connection to check market prices or related information.

It should be appreciated that the functionality described herein may be implemented using any number of different software and database configurations. For example, in certain embodiments one or more severs calculate the probabilities and probability density function, modified the market implied probability distribution based on user input to customize it, generate the data to be charted and determine preferred or optimal trade combinations, and the trader terminals (e.g., running a Java-based application) display such information and transfer trader inputs to the server(s); however, in alternate embodiments, any one or more of the processing steps may be moved to the trader terminal to reduce or even obviate the need for the servers.

As noted above, each workstation 130 operates in accordance with software (for example, residing in local ROM) to provide the user with a graphical user interface (GUI). As shown in the accompanying FIGS. 2, 3, 4A-4H, and 5A-5G, the GUI of the trader terminal 130 of the present embodiment generally includes four windows or panels: a Probability Distribution Builder 1000, which generally displays the probability distribution and permits a user to customize it graphically, a Strategy Selector 2000, which generally displays one or more automatically generated preferred trading strategies and permits the user to select any one or more strategies, Strategy Adjustment/Order Entry 3000, which generally automatically displays trade strategies (e.g., option strategies) and permits the user to modify and submit for trading strategy legs, and Strategy Performance Detail 4000, which generally displays the expected performance of the trading strategy according to any of a number of metrics. Although the panels are arranged vertically, in certain embodiments they may be arranged differently or rearranged or resized by the user or presented at different times (e.g., serially). Furthermore, although the embodiments described contemplate a user computer with a display (e.g., monitor) and mouse interface. The graphical user interfaces may be presented on tablets, smart phones or other different interface devices (e.g., touch screen). Various features of the panels will now be described.

Figure 2:
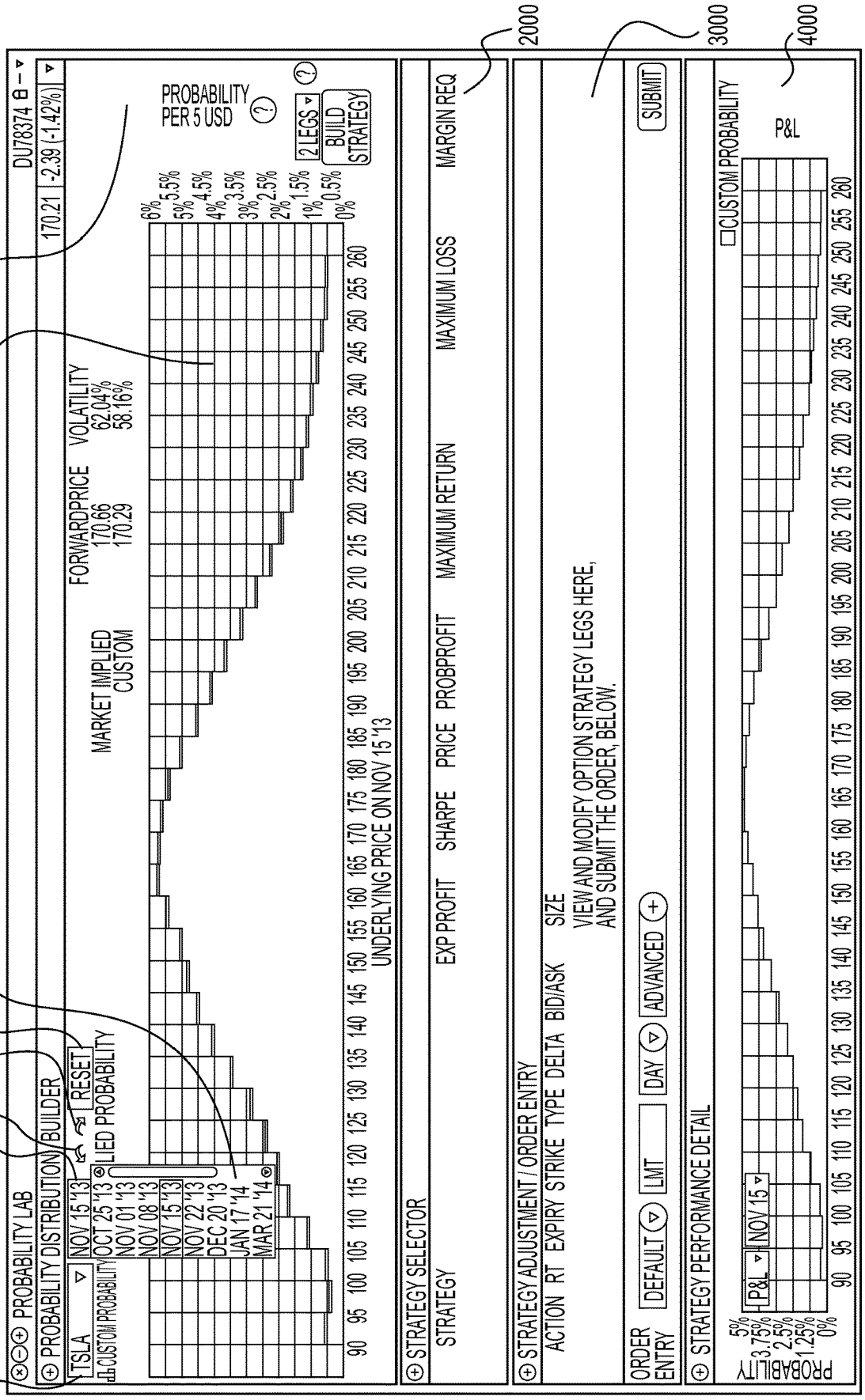
FIG. 2 is a screen shot of the graphical user interface according to one embodiment of the present invention.
Figure 3:
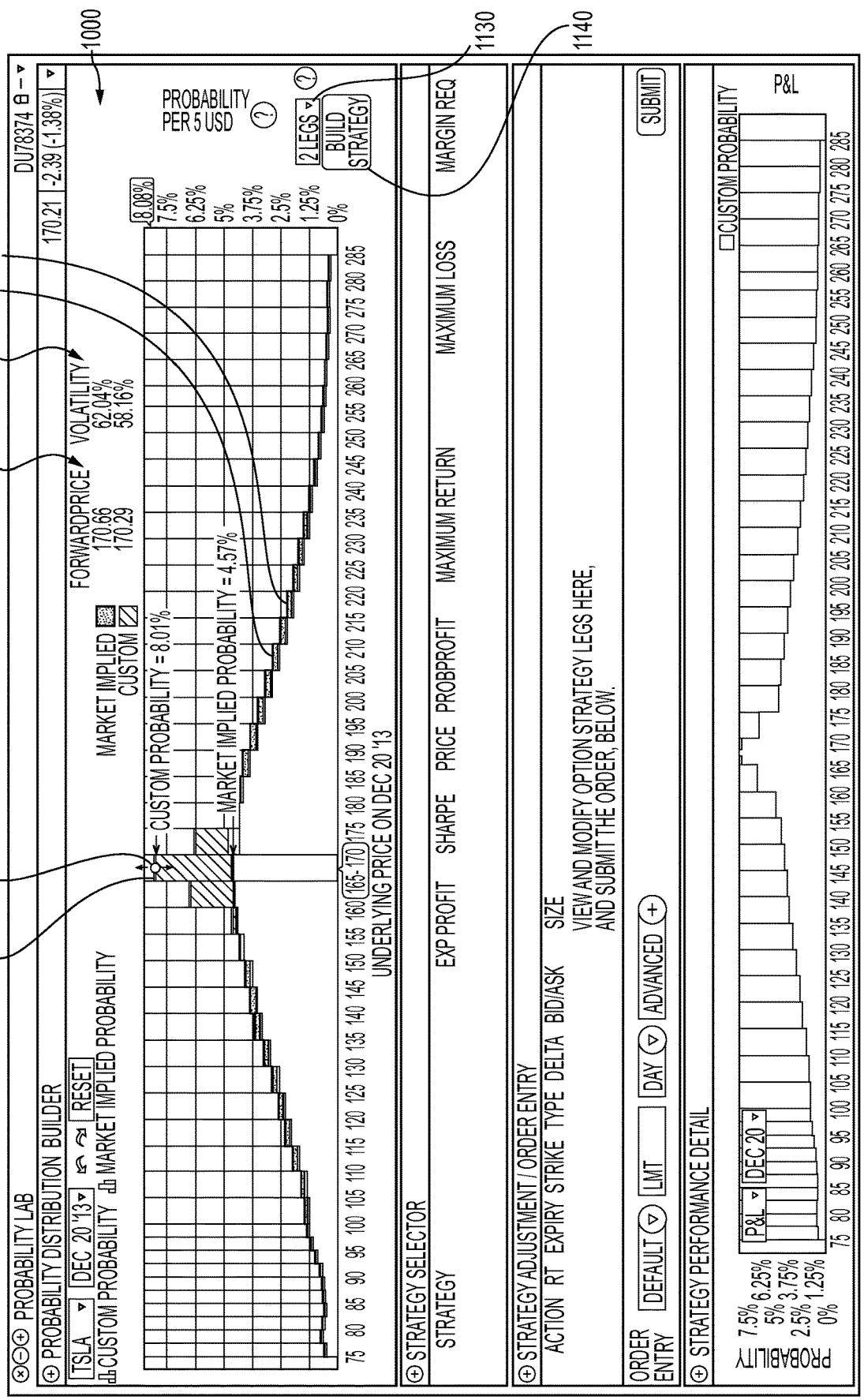
FIG. 3 is a screen shot of the graphical user interface according to one embodiment of the present invention.

Probability Distribution Builder Panel (1000) may include:

a) An input data field or pull-down (dropdown) menu to input the trading symbol of the underlying asset, such as a stock (e.g., TSLA) (1010, FIG. 2).

b) An input data field or pull-down menu to input the future date (1020, FIG. 2) to be analyzed. The dropdown menu (1030, FIG. 2) may automatically be populated with the expiration dates of the option contracts related to the underlying asset (as shown, TSLA).

c) Input Buttons to undo and redo actions (1040 and 1050, FIG. 2) may also be provided.

d) An interactive market implied probability distribution (MIPD) graph (1060, FIG. 2) that displays the MIPD. The graph represents a probability (on the vertical axis) that a price range (as indicated on the horizontal axis) will exist as of the date selected (1020). The intervals for prices or range of prices for the underlying asset are displayed on the X-axis, for example, in uniform ranges (e.g., X dollars) or in alternate embodiments, varying or user-definable ranges. The probability per standard width range, in percentage terms, is displayed on the Y-axis and tracks the movement of the cursor (1080, FIG. 3). As described in greater detail below, the user may customize the MIPD graph by clicking a point on the graph in a displayed price range and dragging the probability either up, to increase the probability that the price will fall within that range, or down, to decrease the probability that the price will fall within the range (1070, FIG. 3). The system preferably recalculates and displays the customized (modified) probability distribution automatically, thereby displaying a customized probability distribution (CPD) graph. As shown in FIG. 3, both the MIPD (1090) and CPD (1100) are preferably displayed simultaneously, for example, in different colors.

e) An Input Button (1055, FIG. 2) to reset the graph to the market implied probability distribution.

f) The last sale price of the underlying asset, updated in real time, may also be displayed.

g) Forward price (1110, FIG. 3)—the expected price of the underlying asset at the selected expiry (1020) for each of the market implied probability distribution and the customized probability distribution—may be displayed.

h) Volatility display (1120, FIG. 3)—for example, the square root of the expected variance of the underlying asset price from present to expiry in daily terms, assuming each of the implied probability distribution and assuming the custom probability distribution.

i) An input field or pull-down menu (1130, FIG. 3) to input or select the number of legs the user desires to include in the strategy to be generated by the system (e.g., 2, 3 or 4).

j) Build strategy button (1140, FIG. 3), which can be activated (e.g., "clicked") by the user to initiate the system's generation of the preferred trading strategies, which are displayed in the Strategy Selector panel (2000).

Strategy Selector Panel (2000) may include:

a) A display of the optimal strategies (generated by the system after the "Build Strategy" button (1140) was activated) and the following information for each strategy:
  i. Expected profit (2010, FIG. 4A) as implied by the customer probability distribution.
  ii. Sharpe ratio (2020, FIG. 4A)—measure of excess return (risk premium) per unit of deviation of the trading strategy.
  iii. Price for the marketable order for the corresponding strategy (2030, FIG. 4A).
  iv. The probability of achieving a gain, assuming the user CPD (2040, FIG. 4A)
  v. Maximum potential gain, for example, in dollars (2050, FIG. 3A) and/or percent of total investment (2060, FIG. 4A), assuming the user CPD.
  vi. The probability of achieving the maximum gain, assuming the user CPD (2070, FIG. 4A).
  vii. Maximum potential loss, for example, in dollars (2080, FIG. 4A) or as a percentage of investment (2090, FIG. 4A), assuming the MIPD and/or user CPD.
  viii. The probability of achieving the maximum loss, assuming the user CPD (2100, FIG. 4A).
  ix. The user's margin requirement (2110, FIG. 4A), which may be calculated based on information stored in a database.

b) The components of a strategy may be displayed in a pop-up floating window or panel (2120, FIG. 4A) when the user hovers the pointer (mouse cursor) on (or otherwise indicates selection of) one of the displayed strategies. In alternate embodiments the components of each strategy may be automatically provided in the panel 2000 by default.

c) Selection button or check box corresponding to each displayed strategy that may be activated by the user to select the corresponding strategy (2030, FIG. 4A) to be displayed in the Strategy Adjustment/Order Entry Panel (3000).

Figure 4A:
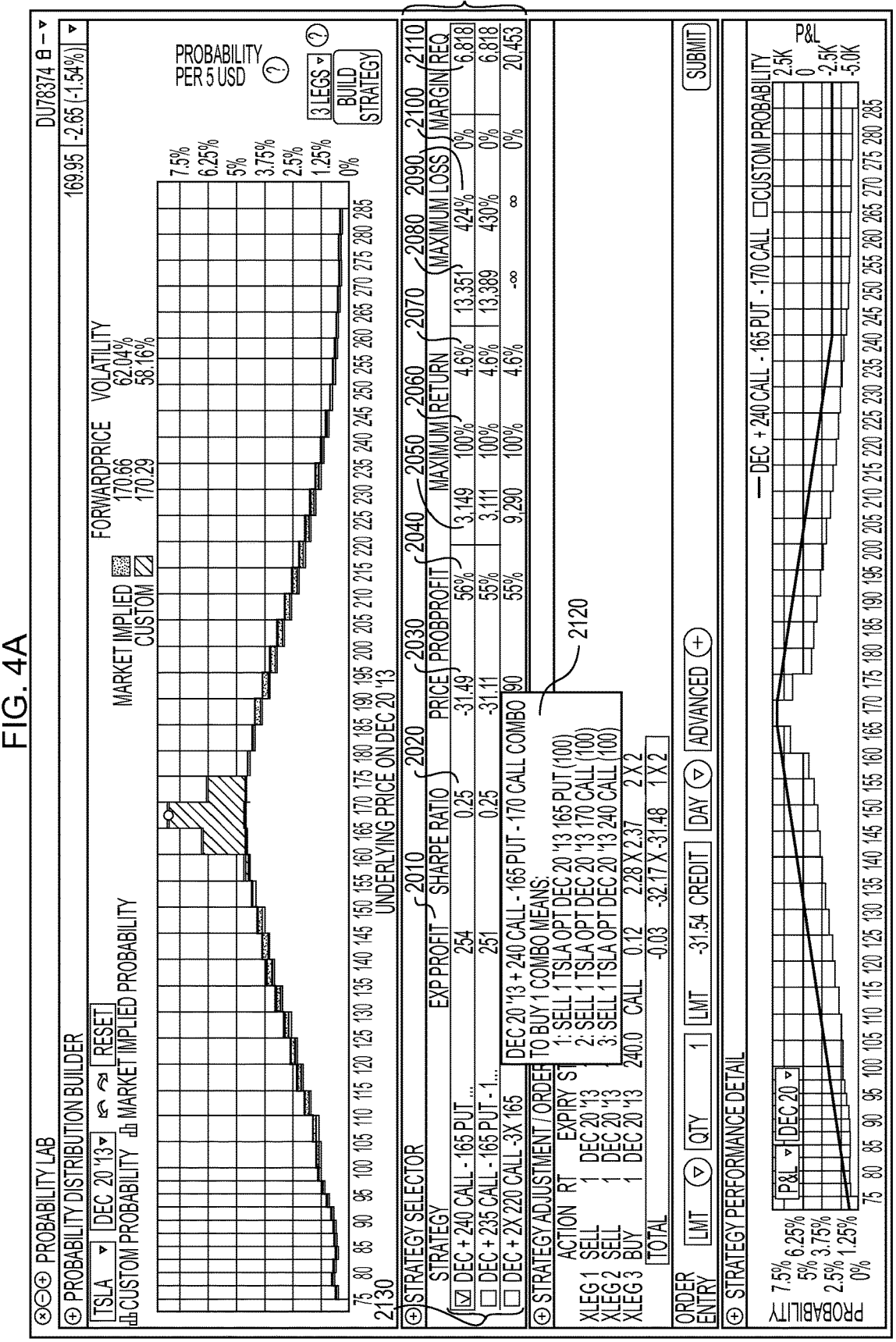
Figure 4B:
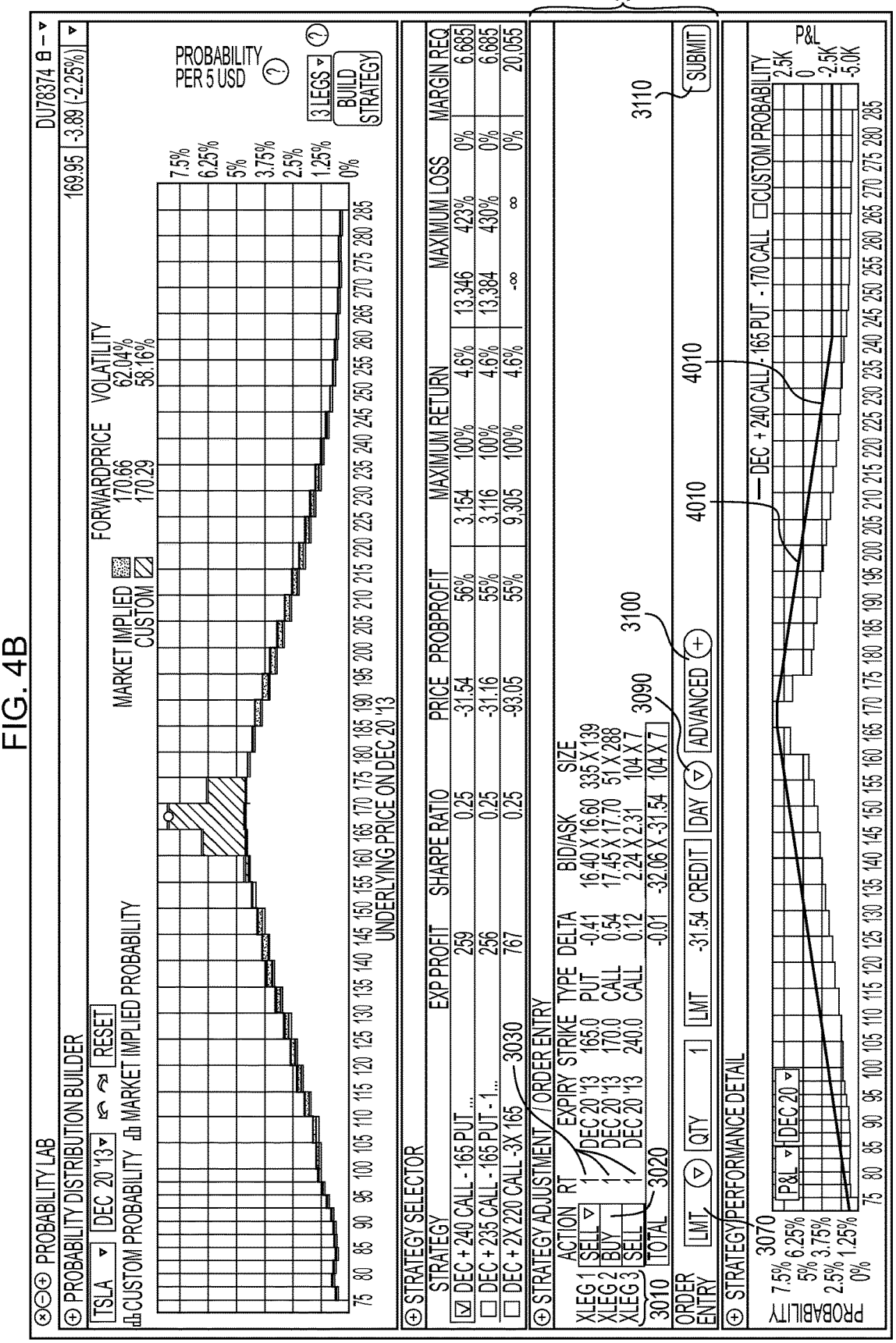
Figure 4H:
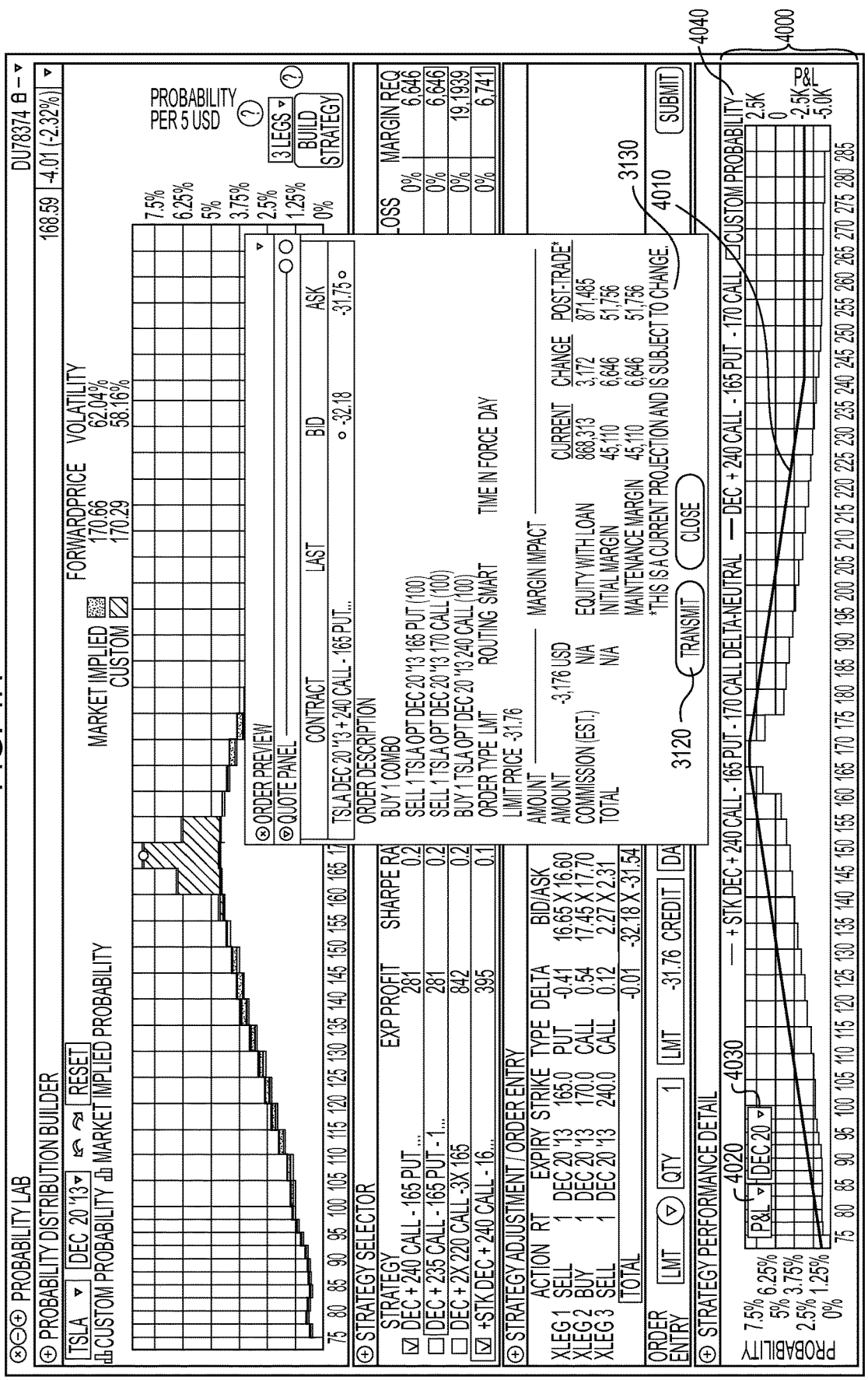
Figure 5A:
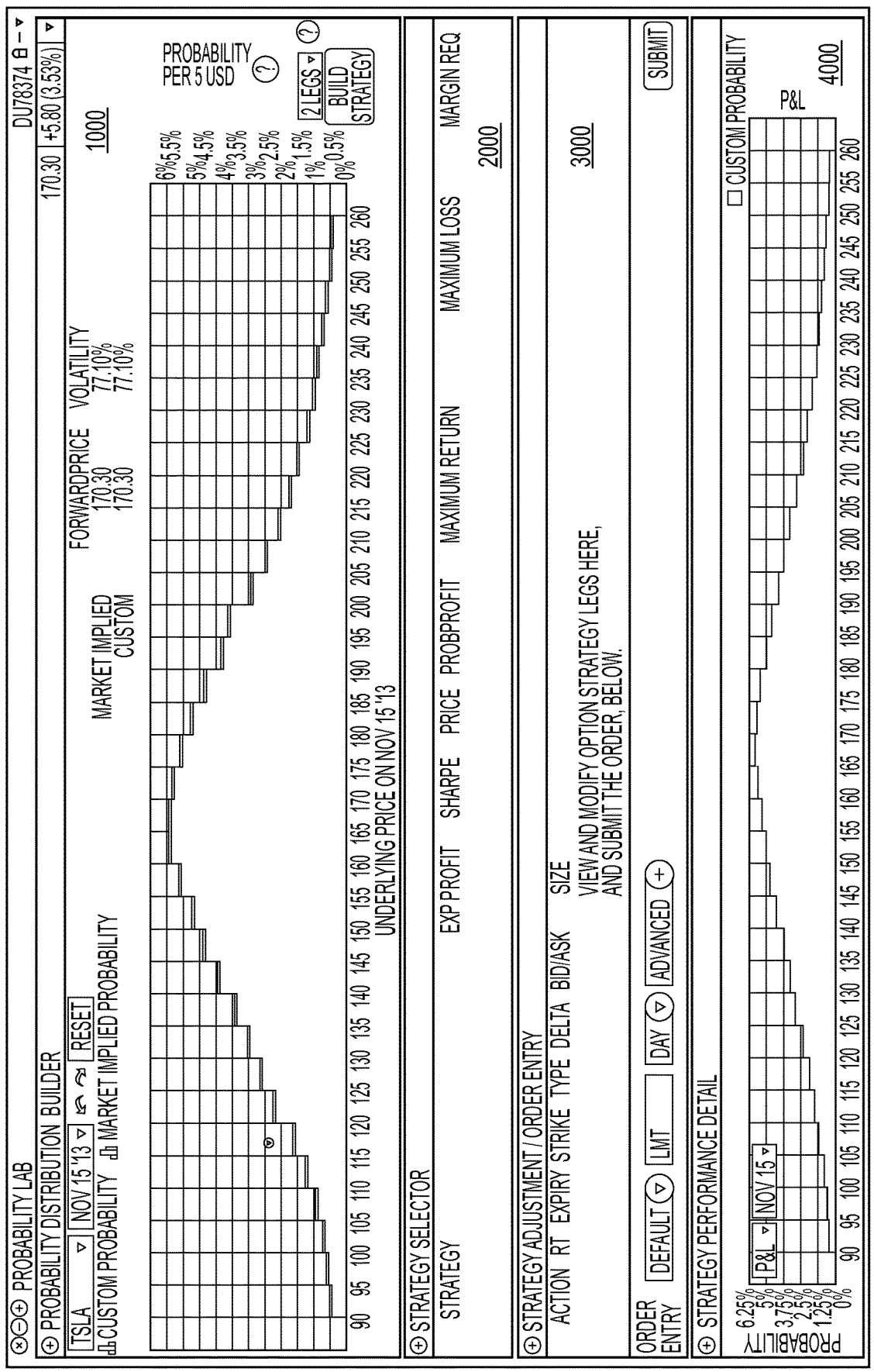
FIGS. 5A-5G are screen shots of the graphical user interface according to one embodiment of the present invention.
Figure 5B:
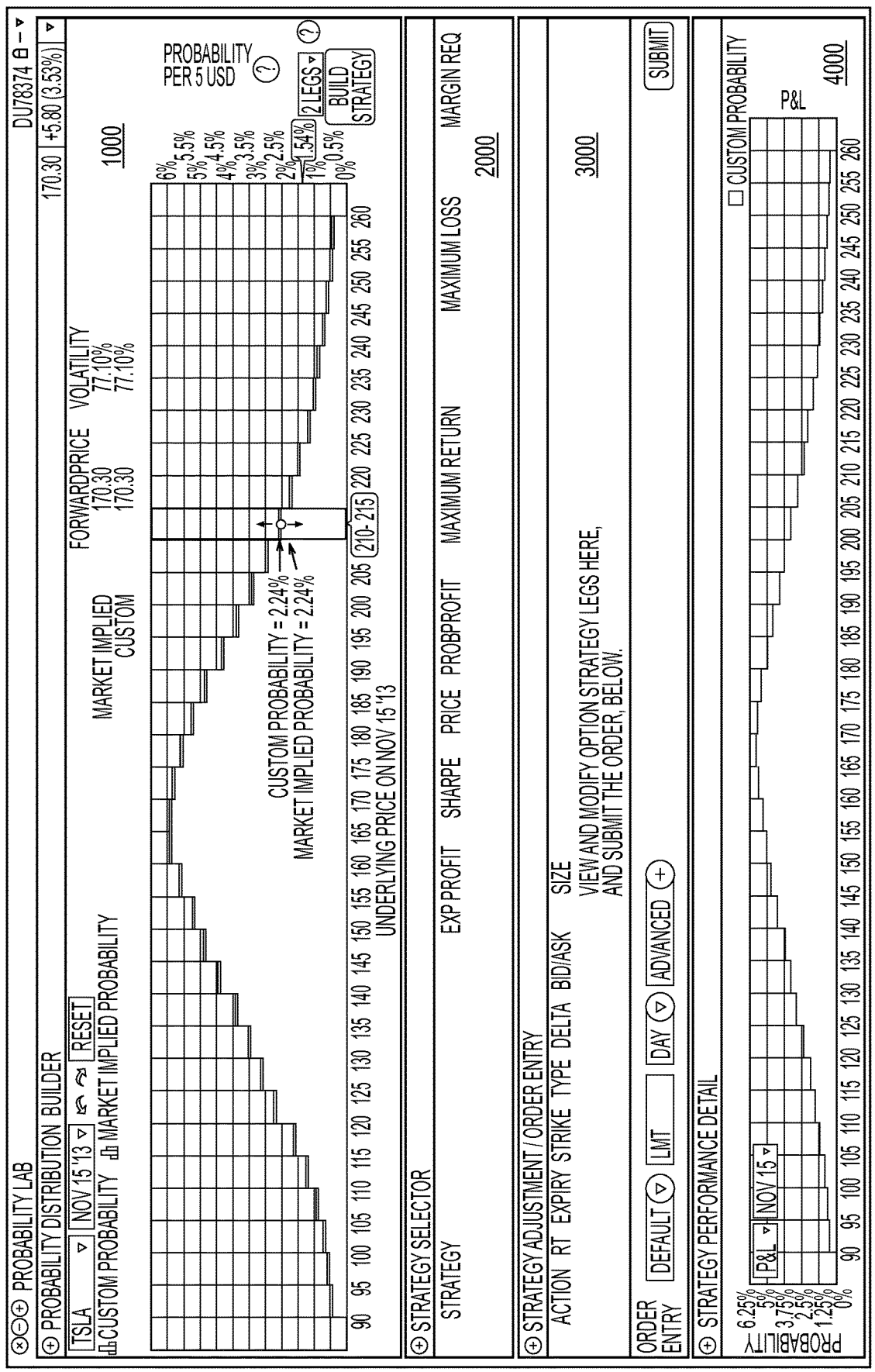
Figure 5C:
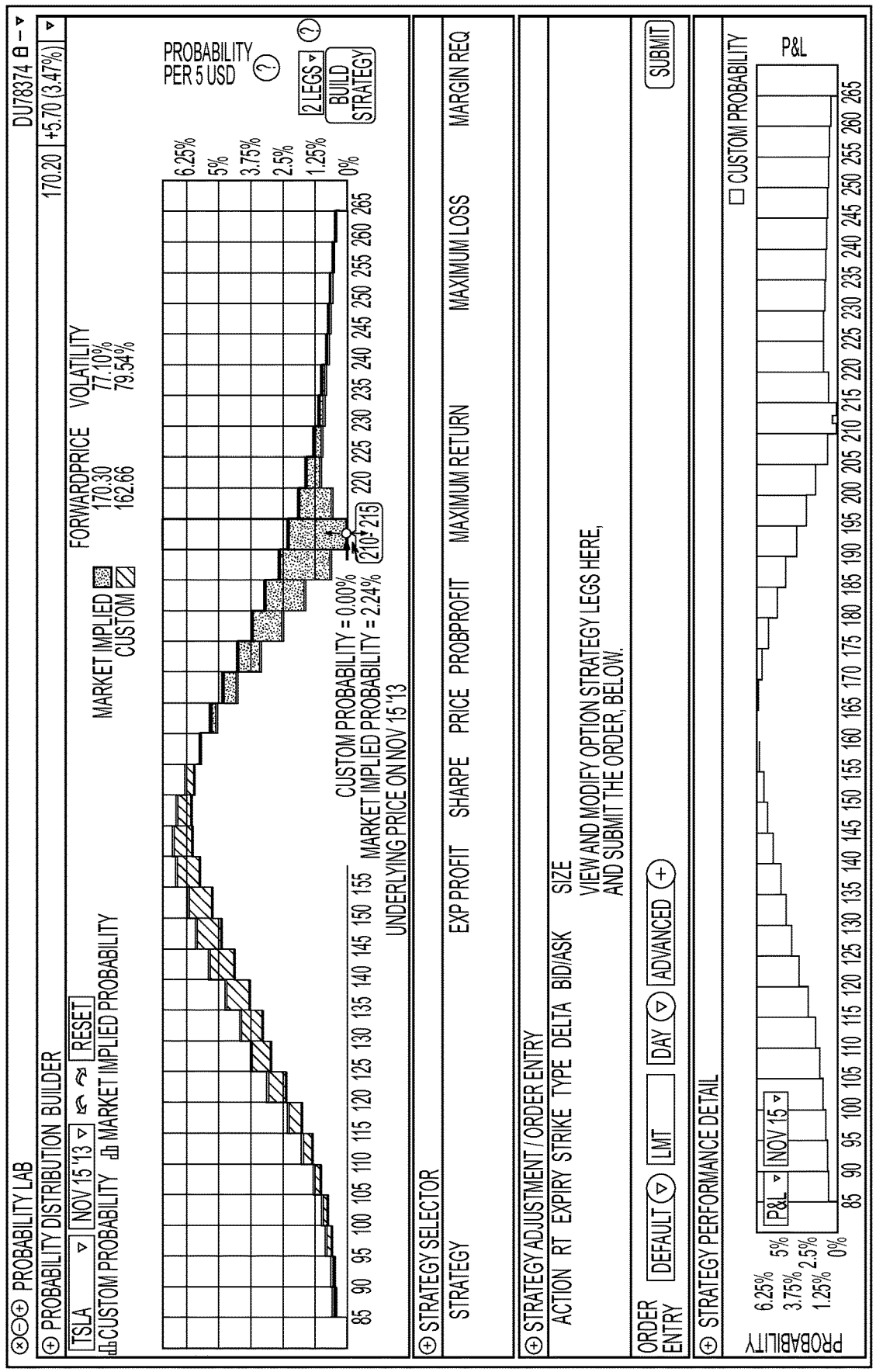
Figure 5D:
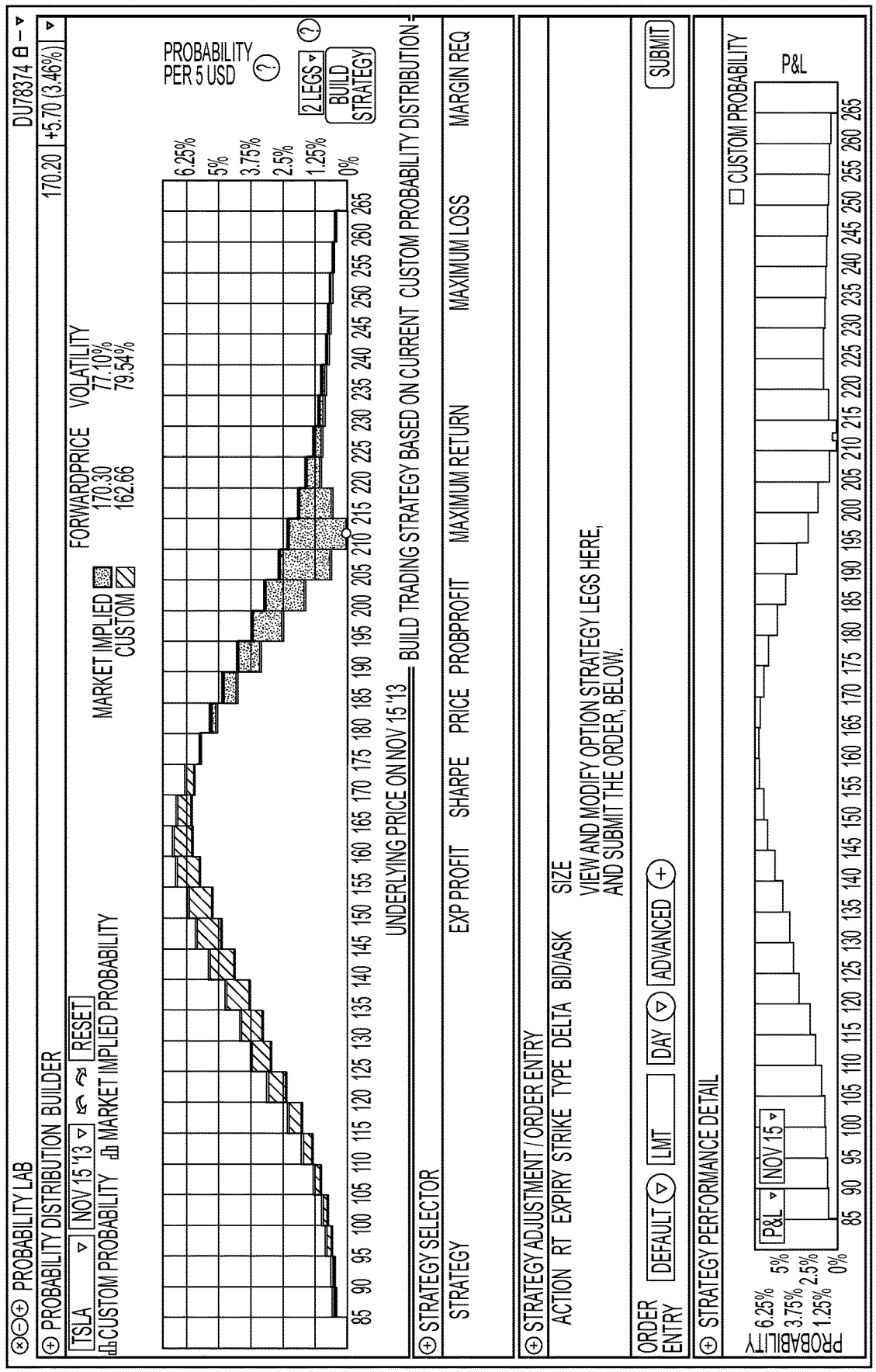
Figure 5E:
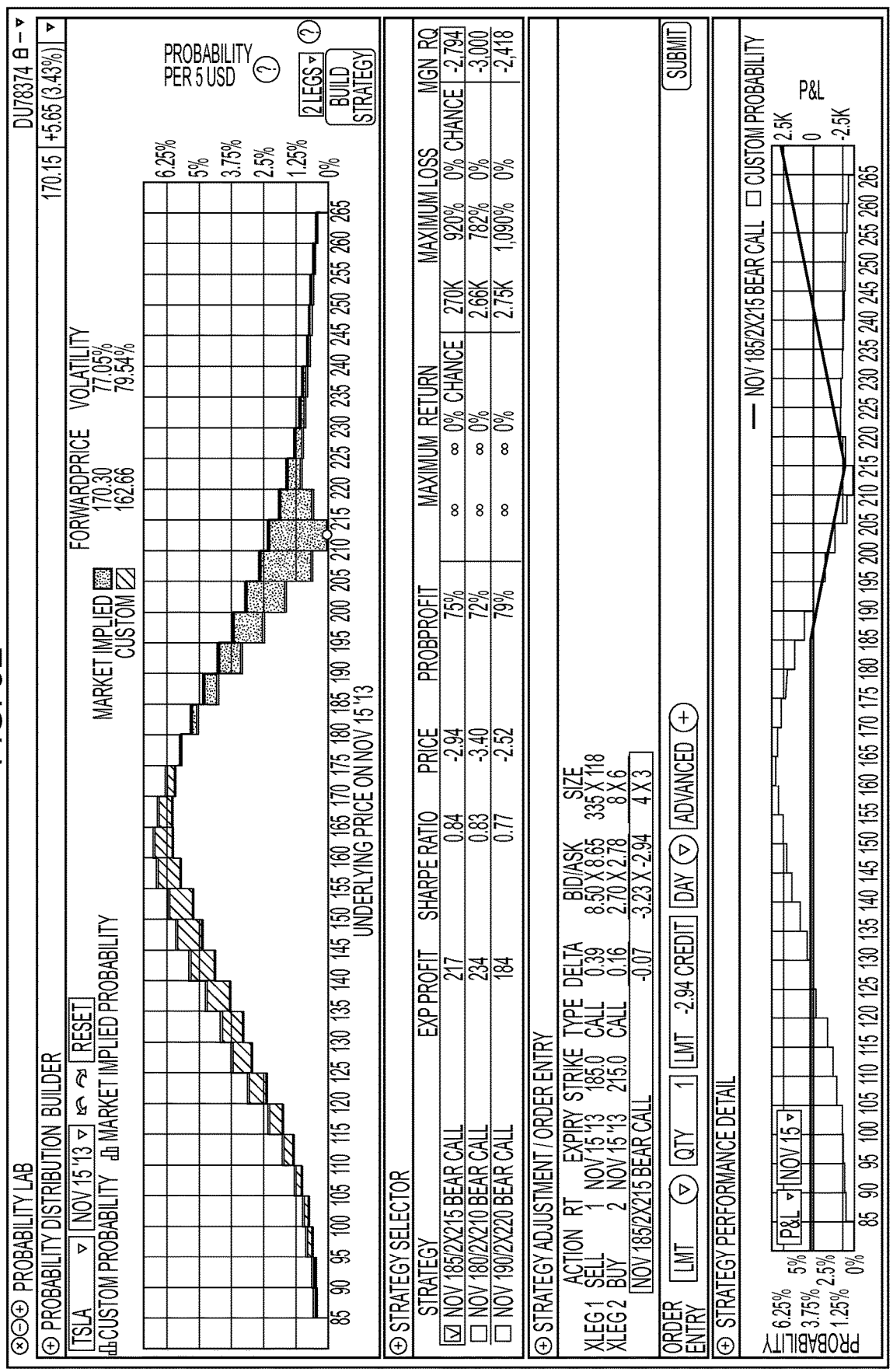
Figure 5F:
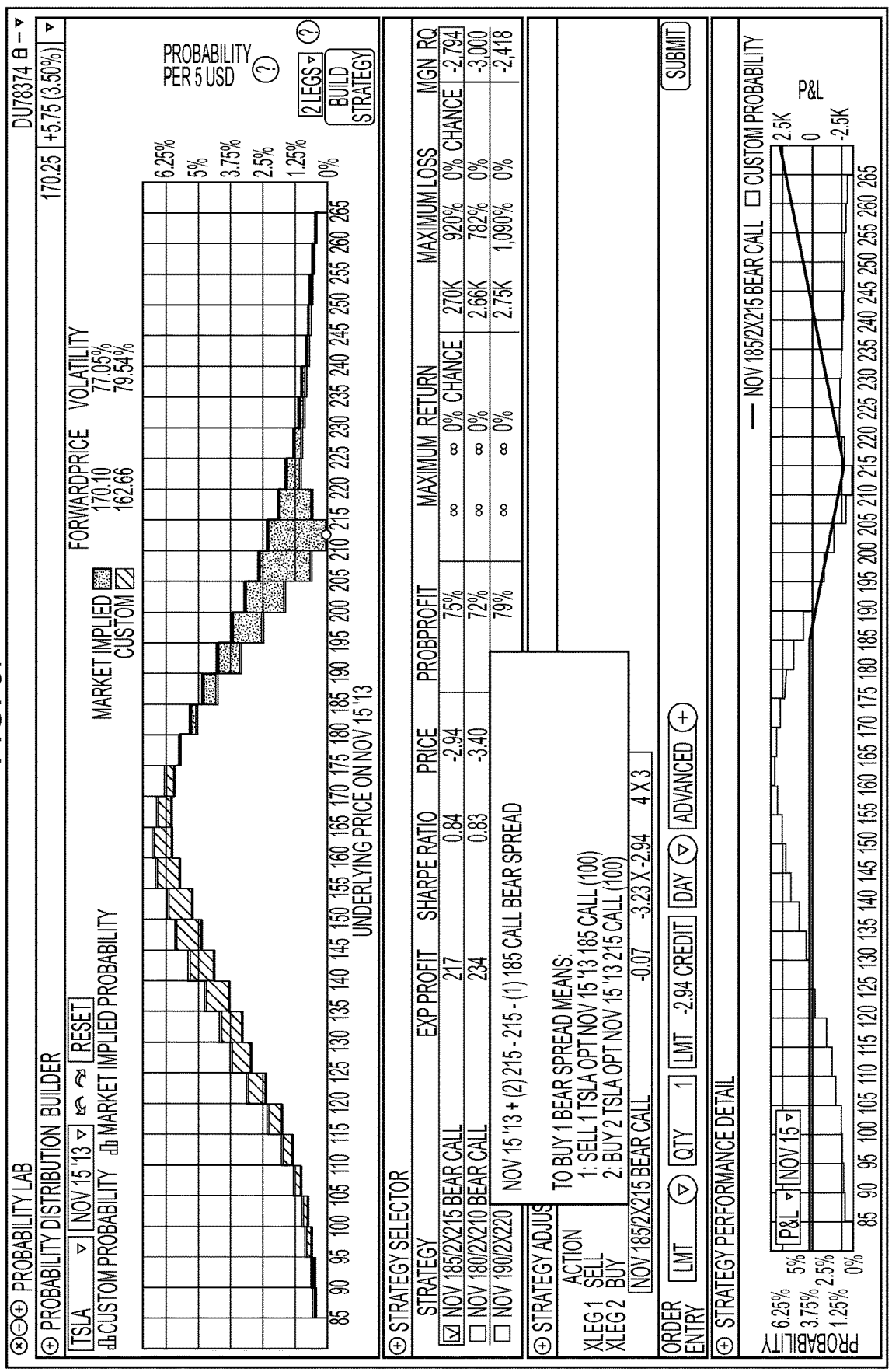
Figure 5G:
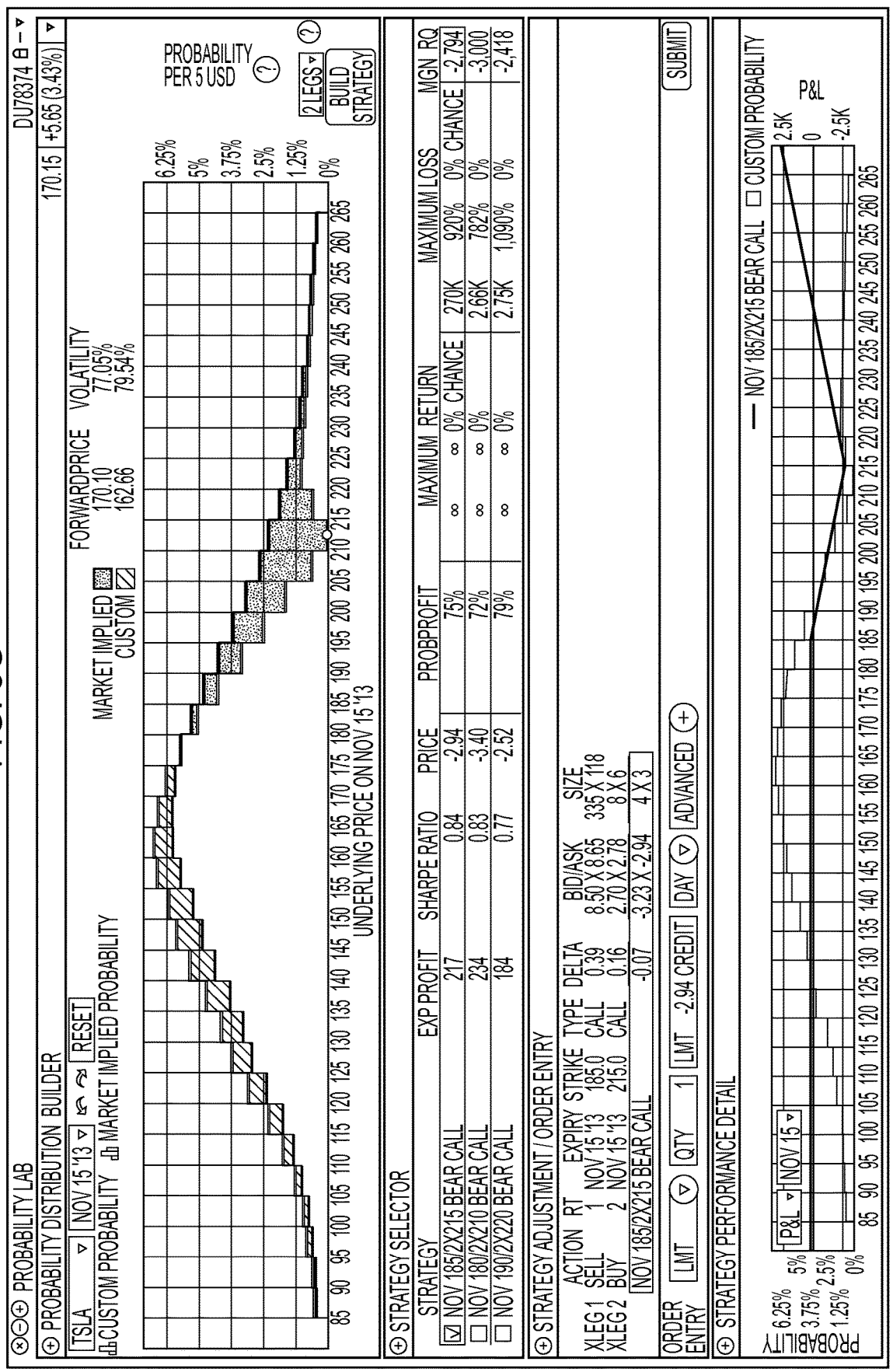

Strategy Adjustment/Order Entry Panel (3000) (e.g., FIGS. 4A-4H) may include:

a) Display of the components of the strategy (also referred to as a "Combo" trade to reflect a combination of component trades or legs) selected by the user (2010).

b) Ability, for example, through input fields, selection boxes and/or pull-down menus, to make the following modifications to one or more legs of the combination order:
  i. Delete a leg
  ii. Change buy/sell action (3020)
  iii. Change quantity (3030)
  iv. Change expiry (3040)
  v. Change strike price (3050)
  vi. Change option type (put or call) (3060)

c) An input field or pull-down menu to specify order type (e.g., limit order, market order, relative order) (3070). For example, a user may select a different order type for each leg of a trade strategy.

d) An input field or pull-down menu to specify order duration (e.g., Day, Good Til Canceled (GTC)) (3080).

e) An input field or pull-down menu to specify more advanced order conditions (3100, FIG. 4B; 3120, 3130, FIG. 4H), which may be presented in the same or separate window, including the following:
  i. An input field or pull-down menu to specify the market/exchange that user wants to route the orders for execution.
  ii. An input field or pull-down menu to specify other order type attributes (e.g., iceberg).
  iii. An input field to create a reference title to the order for tracking purposes.
  iv. An input field or pull-down menu to specify All or None (AON) condition.
  v. An input field or pull-down menu to add a stock leg (additional order for the same or different underlying).
  vi. An input field or pull-down menu to make the trade Delta Neutral (in which case the system automatically modifies the trade so that the Delta of the entire trade is close to zero). This may be accomplished by adding a stock leg with appropriate size to make the resulting combination delta neutral.
  vii. A button or link for the user to activate to check user's current initial and maintenance margin requirements based on user's current positions (stored and updated in a database), which may be configured to preview margin impact for the pending orders.

f) Ability to submit orders for execution (e.g., by the user clicking on the "submit" button (3110) in FIG. 4B). Before transmitting each order to an electronic securities exchange, the system can present a summary (3130) of the parameters and conditions for the order, shown in FIG. 4H, where upon the user's clicking the "submit" button (3120), the order is transmitted to one or more electronic securities exchanges, for example, as may be determined by an order routing algorithm.

Strategy Performance Panel (4000):

a) A graphical representation (4010) of any of the metrics (for example, as may be selected via a pull-down menu (4020)) for the selected or different expiration date for the options (4030) based on the strategy generated by the system and selected by the user or as customized by the user via the Strategy Adjustment/Order Entry Panel (3000), including, for example, the following:
  i. Profit/Loss (P/L)
  ii. Delta
  iii. Gamma
  iv. Vega
  v. Theta
  vi. Rho Other embodiments may also include the calculation and display of the implied volatility for the combinations based on the market implied probability distribution (MIPD) and/or user customized probability distribution (CPD) (as may be selected 4040).

An alternate representation of the graphical user interface is shown in FIGS. 5A-5G.

Figure 6:
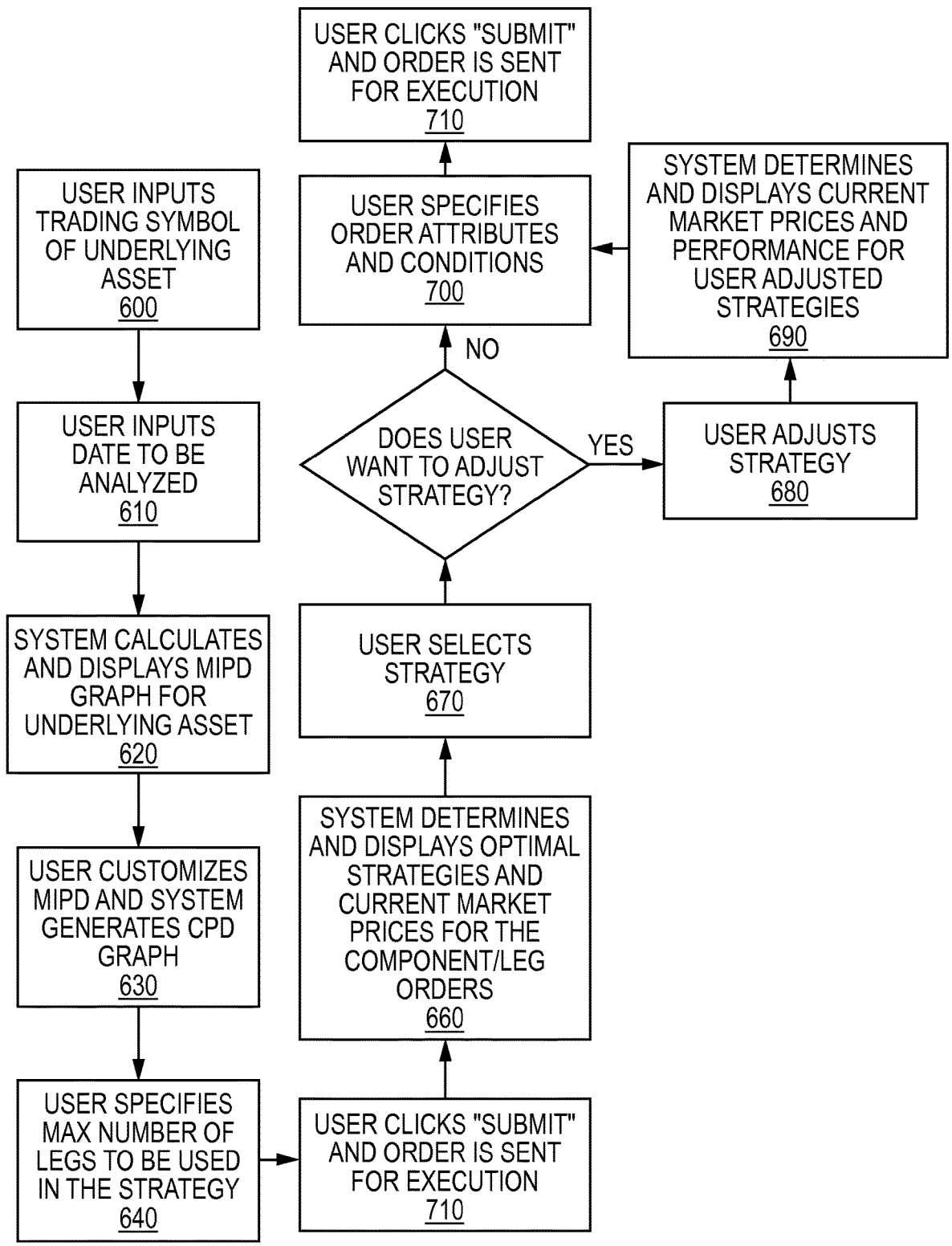
FIG. 6 is a flow chart according to one embodiment of the present invention.

Having described the various features of the graphical user interface of the present embodiment, an illustrative series of operations performed by a user on the graphical user interface of the workstation and performed by the server in response thereto in the present embodiment will now be described with reference to the flowchart of FIG. 6 and continuing reference to FIGS. 2, 3, 4A-4H, and 5A-5G. Although certain of the above features may not be explicitly discussed in the illustrative processes and examples described herein, it is to be understood that they may be incorporated, as would be understood by one of ordinary skill in the art.

At 600, the user inputs the trading symbol of an underlying asset in field 1010. At 610, the user inputs a future date via pull-down menu 1020.

At 620, the system calculates (as discussed in greater detail below) and causes the display of the MIPD for the price of the underlying asset for the user-specified date. In embodiments in which the server(s) calculates the probabilities, the underlying asset and date are transmitted to the one or more servers. Using real time quotes on listed options and the underlying asset, which are preferably provided to the server via a real time data feed, the server calculates the MIPD for the underlying on that date implied by the real time quotes and provides the user's workstation computer with the data to be displayed as the MIPD graph. In certain embodiments, as the underlying quotes change, the server recalculates the MIPD data (e.g., in real time or periodically) and transmits it to the workstation to be displayed (e.g., in real time or periodically).

At 630, the user modifies the MIPD (e.g., by adjusting the probability of the price falling within one or more of the price ranges), and the system generates the CPD (as described herein) based on such user inputs. In the present embodiment, the CPD is generated locally, at the workstation, although in alternate embodiments the CPD is generated by the server based on the user modifications being provided to it.

At 640, the user may specify the maximum number of legs for each of the one or more strategies presented by the system. In the present embodiment, the default number of legs is two, so the system presents to the user one or more strategies, each of which comprises two legs. However, it should be understood that in alternate embodiments, a different number of legs may be set as the default such that the system may generate and display one or more strategies, each including any number of legs. Furthermore, where multiple strategies are presented to a user, each strategy may include the same or a different number of legs (which may be user selected or system defined).

At 650, the user activates the "build strategy" button 1140 to cause the system to compute one or more strategies based on the user inputs (having been communicated (transmitted) to the server). In response to the user's request to build the strategy, at 660, the system determines and causes the display of certain preferred strategies on the graphical user interface.

At 670, the user selects a strategy from the displayed strategies, and the system displays the performance details in the Strategy Performance panel (4000).

If the user wishes to adjust the selected strategy, at 680, the user can modify one or more parameters of the strategy (e.g., one or more of those parameters shown on the Adjust Strategy/Order Entry Panel (3000)). In the event the user does modify the strategy, at 690, the modifications are used as inputs into the system, which then determines (updates) the current market prices for the updated strategy and displays them and updates the performance metrics in the Strategy Performance panel (4000). It should be understood that because the system may overlay the performance of multiple strategies in the Strategy Performance Panel (4000) by virtue of the user selecting a primary strategy and one or more secondary strategies, the system permits the user to modify more than one strategy, the performance of which can be displayed in the Strategy Performance Panel (4000).

At 700, the user can specify one or more order conditions (e.g., accept the default values provided, in which case the user does not need to do anything, or change one or more of the conditions of any individual trade comprising the strategy or the overall strategy, such as ratio among legs, adding a stock trade, and other modifications). At 710, the user submits the fully specified order (consisting of the various component orders) to the electronic securities exchange by activating a predesignated graphical interface element (e.g., the "transmit" button (3110)).

In embodiments in which the one or more servers calculates the probabilities, the underlying asset and date are transmitted to the servers. Using real time quotes on listed options and the underlying asset, which are preferably provided to the server via a real time data feed, the server calculates the MIPD of the prices for that asset on that date implied by the real time quotes and provides the user's workstation computer with the data to be displayed as the MIPD graph. In certain embodiments, as the underlying quotes change, the server recalculates the MIPD data (e.g., in real time or periodically) and transmits it to the workstation to be displayed (e.g., in real time or periodically).

Quotes on listed options consist of a bid and an ask rather than a single price. In addition, options are listed on only discrete strike prices (or strikes). There are an infinite number of probability distributions that are consistent with a set of options quotes. In order to display a single candidate probability distribution, the system (e.g., server) of one embodiment may use the following steps: (a) upon receiving the underlying quotes, the system converts them into a set of implied volatilities, one per listed strike, (b) the set of implied volatilities is smoothed to reduce the noise, for example by fitting volatilities of several nearby strikes to a smooth function, e.g., second order polynomial, (c) as described in greater detail below, a formula/algorithm is used to convert the set of implied volatilities into a probability density function, and (d) as shown in the accompanying figures, the probability distribution is graphically represented as the probability of the future price falling between each pair of listed strikes.

In the present embodiment, the set of probabilities for the underlying asset and the expiry date are provided to the trader workstation. Because the volume of data may be technically unmanageable (e.g., given the number of strikes), the server or workstation (user interface application residing on the workstation) may trim or limit the amount of the data to be displayed. For example, the server may transmit or trader workstation may selectively display only certain of the strikes (e.g., those representing 96% probability instead of 100% probability), not displaying the lower and upper strikes or price intervals (e.g., those strikes or price intervals representing lowest and highest 2% probabilities). In certain embodiments, such trimming of the data is performed by default (e.g., limiting the data to that reflecting some preset percentage probability, such as 96%, or to a percentage probability specified by the user via an input). As such, the present embodiment has the technical benefit of saving or reducing transmission bandwidth and/or processing bandwidth and power.

In alternate embodiments, particularly where the strikes are highly concentrated, the system may display only a certain number of strikes, for example, as defined by a certain pre-set number of standard deviations, such as six or seven, or a number of standard deviations specified by the user, thereby omitting display of data at the lowest and highest ends of the probability distribution (sometimes referred to as "tails"). Although the data for such tails exists and may be non-zero probabilities, the user may adjust them to zero. As shown in the illustrative figures of the present embodiment, the lowest and highest strike is each initially shown as zero probability (although non-zero data exists), and each may be subsequently modified by the user as part of the customization of the MIPD graph.

As noted above, the user has the ability to modify the MIPD graph so as to reflect the user's own sentiment of the probability that the future price of the underlying asset will be in a certain range ("Custom Probability Distribution" or "CPD"). The user can modify the MIPD graph, including, for example, by moving the horizontal bar in any price interval up and down by dragging with a cursor/mouse or other interface. Because the graph is scaled when generated and displayed, with the height of each price interval segment of the bar graph corresponding to a probability (e.g., X vertical pixels equals 0.01 probability), moving the bar a certain distance (number of pixels) changes the probability an amount corresponding to the distance moved based on the same scale. In alternate embodiments, the user may enter the modified probability or the amount of the change in the probability numerically, for example, by activating a probability bar within a price range and typing in the numerical value. The graph is then updated based on the entered amount.

When the user changes the probability bar within a price interval (e.g., between two strikes), the system (i.e., server in the present embodiment or server and/or workstation) automatically adjusts the probabilities for other price intervals to guarantee that total probability is still 1.00 (100%). In other words if the user increases the probability of a price interval by X, then the system may decrease the probabilities associated with one or more other price intervals by X (and vice versa) to maintain a total probability of 1.00 (100%). The system may also automatically adjust the probability values within other price intervals (between other strikes) to preserve the reasonable shape of the curve. For example, in certain embodiments, where the user adjusts a probability associated with a price interval, the system automatically adjusts probabilities of nearby price intervals in the same direction (up or down) (e.g., such that the difference in probabilities of some number of adjacent price intervals is less than a certain amount), and probabilities associated with other price intervals (e.g., towards the tails or on the other side of a curve) are adjusted in the opposite direction. In some embodiments the amount the user adjusts the probability of a price interval is offset or redistributed proportionately across the other price interval having non-zero probabilities. In alternate embodiments the amount of the user modification is offset in equal amounts over the price intervals having non-zero probabilities. In still other embodiments, the amount that the user adjusts the probability in a price interval is offset either proportionately or in equal amounts over a subset of the price intervals (e.g., those within a certain number of one or more standard deviations of the price interval having the highest probability).

In still further embodiments, the user is able to customize more than one probability in the MIPD graph. For example, the user may, by activating a mouse on a portion of the graph, "grab" the graph and change the shape of the curve by moving the mouse.

Once the user customizes the MIPD graph, if at all, the system may automatically re-scale the MIPD and CPD graphs and display.

The system preferably simultaneously displays the original MIPD graph and the CPD graph. The two graphs may be distinguished by different colors. As the user hovers the cursor over (or otherwise selects) a price interval, the corresponding MIPD and CPD probability values are displayed. Preferably, the system also automatically adjusts the scale for the graphs based on the user adjustments and adjusted range of probabilities.

The system can propose optimal or preferred strategies, each strategy consisting of a combination of option orders. The user selects the number of legs they would like to use and clicks the "Build Strategy" button. Based on the user's CPD the system calculates and displays the proposed strategies. In the present embodiment, the proposed strategies are chosen by the system to optimize the expected profit of each strategy assuming the CPD based on the user's input (if any) is correct. In the present embodiment, these optimal strategies are derived by iterating through the possible combinations of orders with the number of legs as specified and the leg ratios (i.e., ratios of the value of each leg in the multi-leg trade) not exceeding some predetermined limit, which may be set by the system or, in alternate embodiments, the user or user's administrator. For each combination the system computes expected profit of the trade based on the user's CPD. The system also computes the standard deviation of profit under the MIPD. The combinations are sorted according to the ratio of expected profit to standard deviation (called the Sharpe ratio). Several of the top ranked combinations are presented to the user as the proposed strategies. In alternative embodiments, the user may configure what factors should be considered or prioritized in the determination of an optimal strategy.

The user can select a proposed strategy by clicking the corresponding box next to the strategy. The user can then modify the combination of orders that the strategy consists of. Lastly the user can submit the combination of orders by clicking on the "Submit" button.

The user may also choose to have the system build and display a graphical representation of the potential profit and loss outcomes of a strategy, and measurements related to the strategy, including Delta, Gamma, Vega, Theta and Rho, or in alternate embodiments, other measurements, such as implied volatility of the combinations.

Determination of MIPD and CPD

A well-known formula in option pricing theory first proposed by Breeden/Litzenberger in about 1978 ("the BL formula") relates risk-neutral probability density function of an asset to second derivative of European option prices with respect to the strike price. It is also known that this formula can be reformulated in terms of implied volatility of European options (rather than price of European option). In practice, only a discrete set of strikes is available (whereas computation of second derivative requires a continuum of strikes), most exchange-listed options are American (whereas the formula requires European prices), and also prices of options in the market are noisy (caused by bid-ask spread and other factors). Nevertheless, those skilled in the art have known how to compute the probability.

Although such known and hereafter developed ways to compute probability may be used in various embodiments of the present invention, the present embodiment receives market option quotes and converts each into a single price using mid-point of the quote. If the option is American, the system converts its price to that of a European option using a standard numeric procedure. This utilizes stock dividend and interest rates data, although in other embodiments other inputs may be utilized.

Both European option prices and their implied volatilities obtained this way exhibit noisy behavior across the strikes (e.g., caused by bid-ask spread), which may result in wildly oscillating values of probability density function across strikes. Consequently, the present embodiment reduces or eliminate the noise in implied volatilities (and hence option prices) using a filter, after which the system uses the forgoing methodology to compute approximate values of probability density function at each strike (the more strikes available, the more precise the approximation becomes).

Certain formulae are employed in the present embodiment, including the following.

Where A is the probability and is displayed on the MIPD graph, P is the PDF and K is the strike price, future values may be determined from:

$$A = \sum_{i=1}^{n-1} A_i, \ A_i = \frac{1}{2}(P_{i+1} + P_i)(K_{i+1} - K_i)$$

(as noted herein, for user modification, the system maintains a constraint of A=1); and, where F is the forward price implied by the PDF:

$$F = \frac{1}{6}\sum_{i=1}^{n-1}[K_i(2P_i + P_{i+1}) + K_{i+1}(P_i + 2P_{i+1})](K_{i+1} - K_i)$$

Volatility may be determined from:

$$V = 2\ln F - \frac{1}{2}\sum_{i=1}^{n-1}(P_iK_i + 3P_{i+1}K_i - 3P_iK_i + 1 - P_{i+1}K_{i+1}) - -$$

$$\sum_{i=1}^{n-1}\frac{K_i(P_{i+1}K_i + P_iK_i - 2P_iK_{i+1})\ln K_i + K_{i+1}(P_iK_{i+1} + P_{i+1}K_{i+1} - 2P_{i+1}K_i)\ln K_{i+1}}{K_{i+1} - K_i}$$

Volatility is $\sqrt{V/T}$ (where T is days until expiry).

Although alternate techniques may be used, the present embodiment filters out noise in the implied volatilities as follows. Given the initial implied volatility curve, the system attempts to locally approximate it as a quadratic polynomial by doing a weighted regression. The weight of each of nearby strikes decreases in relation to its distance to the strike where the smoothed value of implied volatility is currently computed so that effectively only strikes within one expected underlying price move are used. When strike spacing is much smaller than the expected price move, the regression will include many strikes and noise will be eliminated to a large extent. When strike spacing is much larger than the expected price move, only two nearby strikes will be used (although in these cases the effect of noise on PDF is typically small to start with).

The expected underlying price move can be estimated from implied volatilities of options (e.g., from the option closest to forward value) and time remaining until expiry. For example, if implied volatility is 1% and there are 50 days until the option expires, the expected move in percentage terms will be around 7% (or implied volatility times square root of time to expiry). To get the expected move in price terms, one would need to multiply 7% (or 0.07) by the underlying price. Thus, for example, if price is $20, then the expected move is around $1.4.

Sometimes the range of strikes available in the market is relatively narrow such that cumulative probability inside the range is noticeably different from 1 (e.g., about +/−0.01 in certain embodiments). In these cases, the system adds a number of fake (or artificial) strikes below/above the last available strike on each end, and then extrapolates implied volatility and computes probability density function for the actual and fake strikes. The system displays the probability of the price falling between two neighboring strikes rather than value of probability density function. To compute this probability, the system uses linear interpolation of probability density function between the strikes. Probability is the area under the curve between two strikes (i.e., the interpolated value of the probability distribution function multiplied by the difference in adjacent strikes, e.g., $5).

To select the fake strikes, the system first determines how much probability is contained below the lowest existing strike, and above the highest existing strike, and what the error of disregarding the rest of the curve (i.e., the portion of the curve beyond such lowest and highest strike regions) would be on pricing of futures/options. The system keeps adding strikes until that error becomes negligible (e.g., lower than a predetermined or user-selected threshold; for example, if the error of forward value of a 100 dollar stock is 0.1 cent, the system may consider it negligible and acceptable). The new fake strike(s) is (are) added higher/lower than the last available strike in each direction.

When a trader changes a probability bar between two strikes, the system may automatically adjust the values for other strikes for potentially two reasons: (1) to guarantee that total probability is still one and (2) to preserve a reasonable shape (i.e., probabilities) of the curve.

In general, as the user makes adjustments, the systems ensures the sum of all probabilities is 1, that none of the individual strike probabilities is below 0 and modifies a few points near the user-modified strike (e.g., the probabilities of one or more price intervals on either side of the user modified price interval) in the same direction as the user adjustment, and then does a cycle of normalization, excluding the user adjusted and other adjusted points, adjusting such other points in the opposite direction (for example, as described above) to ensure the sum of probabilities is 1. With regard to preserving a reasonable shape, it should be appreciated by those skilled in the art that preserving a reasonable shape to the curve is somewhat subjective and may be accomplished in different ways, if desired at all. In certain embodiments, when the user changes probability between two strikes, the system also adjusts the probability for nearby strikes. In general, strikes that are closer to the region being changed by the user will get a larger adjustment compared to strikes that are further away because strikes within one expected price move of each other are presumed similar, so probability for the price to end between two nearby regions should also be similar. For example, suppose stock is worth $100, has volatility of 2% and there are 100 days to expiry. Then expected stock move before expiry is $20, and strikes 99, 100, and 101 are very similar so that probability for the price to be between 99 and 100 shouldn't be too different than probability between 100 and 101. If initially the probabilities were 0.009 and 0.01, and the user changed the first one to 0.04, it would be unreasonable to expect that the probability in these two regions is different by a factor of 4 when the stock can cross both regions in a single day. Another reason to adjust nearby strikes is some underlying assets have over 100 strikes and adjusting all of them would be too cumbersome.

In one embodiment, 0.5 standard deviation on either side of the user changed strike (price interval) are affected. This would be interval $K*\exp(-0.5*dailySigma*\sqrt{T})$ to $K*\exp(0.5*dailySigma*\sqrt{T})$, where T is time to expiration and K is the price. An attenuation factor may be used, and in one embodiment is expressed as: $\exp(-A*(\log(strike/K))^2/(dailySigma^2*T))$, where A is properly chosen factor, such as 0.3. The remainder of the strikes in the cycle are normalized (adjusted) to reach a sum of probabilities that is equal to 1.

Next, the system converts the new probabilities between strikes to new values of probability density function (to be used for the calculation of combinations). After the trader finishes the modifications to the curve (if any) and requests calculation of best combinations, the system computes prices of options using the market implied and modified distribution (e.g., the inverse of the BL formula allows one to express the price of European option via an integral of probability density function over a range of future prices, after which one can compute price of American option using standard methods). For each combination used in the search for the best combinations to be presented, profit or loss is determined (and where appropriate, displayed) by the difference in these prices multiplied by the size for each leg.

It should be understood that the "best" combinations may be defined and identified in accordance with any of a number of different parameters and algorithms. In the present embodiment, combinations are sorted according to ratio of profit of the combination at expiry and standard deviation, or Sharpe ratio. Profit is computed as difference between price computed using custom and market implied PDF multiplied by leg ratios. The system also incorporates bid-ask spread into profit calculation, so that if a leg has negative size and the corresponding option needs to be sold, the system assumes it will be sold at the worse price, i.e., bid price. The system also imposes an additional penalty for options that may be exercised early (e.g., because once this happens, the risk/reward profile of the resulting combination may be quite different than that of initial combination). One approach here is based on known principles of quadratic programming. However, a difficulty with such an approach may be that it cannot work with discrete leg ratios, cannot select a number of legs within certain limit (e.g., it may find combinations with 50 legs or which have fractional leg sizes, neither of which is practical nor allowed by exchanges), and cannot produce more than a single best combination. Accordingly, the algorithm of the present embodiment attempts to search for the best combinations by going through all possible permutations of strikes and sizes of each strike using no more than 4 legs. Alternatively, the user can be given the option of inputting or selecting the number of legs.

If the number of strikes is relatively small, the algorithm completes in a relatively short time and will find the best combinations (since it exhausted all possibilities); however, as number of strikes increases, time required also grows and to ensure a quick response, the system may remove some of the combinations. First the system selects a number of representative equidistant strikes so that number of permutations is below a threshold (e.g., that is selected based on how much time it takes to go through all permutations). Then the system performs an exhaustive search, as explained above, for the selected strikes, keeping a stored list of a few (e.g., three, though any other number may be used) best combinations. Once this step is completed, the system refines each of the best combinations by replacing all strikes in the combinations with their neighboring strikes within some range, where, for example, the range is computed so that the task is computationally manageable (e.g., based on the processing power available, known processing time for a certain number of equations and/or the processing time desired). When considering whether to replace a strike in the combination with another strike, consideration may be made of a rank of that strike. That is, the rank is computed in advance by sorting all options according to the absolute value of ratio of potential profit to market price. Options with low rank are discarded to reduce the amount of work. Some of the combinations found this way may be very similar to each other. The system can optionally eliminate similar combinations by removing slightly inferior but near top combinations with payoffs very closely correlated to payoff of another combination, where correlation is computed, for example, using market implied distribution.

To give an example, suppose an $800 stock with strikes in the range $200 to $1600, separated by $5. There will be about 280 strikes in all (and 560 options, i.e., call and put for each strike). If an exhaustive search is done for all 4-legged combinations with leg ratios ranging between −4 and 4, it will require tens of trillions of evaluations, which will take a long time to complete on existing computers, which certainly is not acceptable for a commercially viable interactive trading tool. Consequently, the algorithm may be programmed to use only a certain number of, e.g., 40, strikes for initial computation, in the example, considering all combinations with strikes at 200, 240, 280, etc. This will require only a few hundred million evaluations and can be done in a fraction of a second with existing computer technology. Once top combinations are identified, the system may expand the range for each strike, for example, by replacing a strike of 800 with any of 775, 780, 785, . . . 825, strike 880 with any of 855, 860, etc. and search again.

In alternate embodiments, other algorithms may be used, among them: 1) maximize profit while keeping maximum loss within given range of underlying price constant; and 2) maximize profit by keeping "haircut" constant (i.e., the amount of collateral that needs to be posted). Both of these (and also another versions of the Sharpe optimizer algorithm) may use quadratic programming with additional logic to turn the combination into acceptable form (e.g., no more than four legs, integer leg ratios).

In alternate embodiments, the user may preset user's opinion for a stock, industry, or sector. For example, if a trader thinks that a certain event will occur near expiry that would have a negative effect on the energy sector, then user would create a preset button that reflects his opinion. The trader would name the preset button "Event X Risk—Energy Sector" and then give it a corresponding percentage that reflects the trader's opinion (e.g., energy stocks will be down 10% at expiry as a result of Event X). The trader would then have the ability to apply this preset opinion for trades on any energy sector stock by clicking on the preset button. The system would automatically customize the MIPD graph as to reflect user's preset opinion.

In another alternate embodiment, the user may customize the MIPD graph by changing the implied volatility percentage or the forward price.

In still other alternate embodiments, optimal strategies may be determined using different measurements, or may be determined using measurements that are configured by the user.

Trading Example

An example of trading using the present embodiment will now be presented with reference to FIGS. 5A-5G for illustration purposes.

Trader enters the trading symbol for Tesla Motors, Inc.—TSLA.

Trader selects the Nov. 15, 2013 expiry.

The MIPD graph shows that the market implied probability of TSLA being in the price range of $210-$215 is 2.24%.

Trader believes that the probability of the price being above $210 is zero and he sets the bar accordingly.

Trader selects the number of legs to be used in the combination of orders.

Trader selects two legs and then clicks the "Build Strategy" button.

Three strategies are displayed. Trader selects the first strategy: Nov. 15 2013+(2) 215−(1) 185 Call Bear Spread.

Trader reviews the components of the strategy:

Leg 1: Sell 1 TSLA OPT NOV 15 '13 185 Call (100)

Leg 2: Buy 2 TSLA OPT NOV 15 '13 215 Call (100).

Trader selects LMT (limit order) and clicks "Submit" to submit the order.

Figure 7:
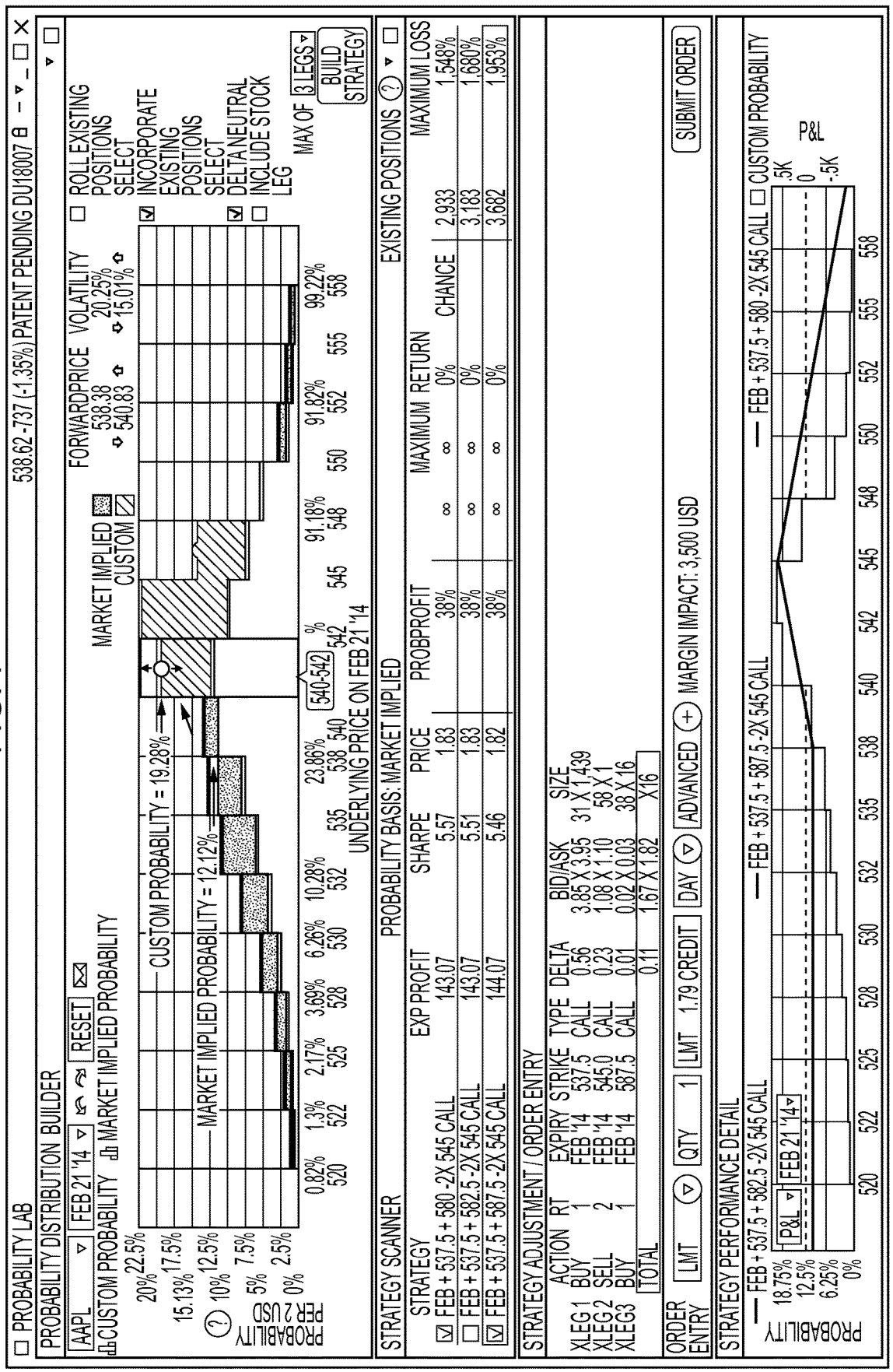
FIG. 7 is a screen of the graphical user interface according to an alternate embodiment of the present invention.

An alternate embodiment will now be described with reference to FIG. 7, which includes a graphical user interface illustrating the following eight general operations (1-8), with explanatory text shown in "bubbles."

1. User enters a stock ticker (AAPL) and selects an expiration date (Feb. 21, 2014). The market defined Probability Distribution (PD) is built and the MIPD graph is displayed.

2. The user may customize the MIPD graph by using a mouse to "grab" the bar in any price interval and, for example, pull it up to reflect is a higher probability of the stock price ending up in that price interval at the expiration date specified. The user may pull it down to reflect a lesser probability of the stock price ending up in that interval at the expiration date specified. As with the embodiments discussed above, all probabilities add up to 1.00 so the user will see the other probability levels adjust when making changes in any price interval.

The user can also adjust the probability using the up/down arrow icons near the values, or by dragging the hand icon to the left or right within the distribution graph.

3. When the user is satisfied with the CPD, the user specifies desired parameters, selects the minimum number of legs desired in the option strategy, and clicks the Build Strategy button/input.

Roll Existing Positions—In the present embodiment, if the user has an existing position in the underlying stock, the user may select a "Roll Existing Positions" input, which causes the system to include the existing positions in the underlying in the strategy. The Strategy Builder module will attempt to create a strategy that gets the user out of the selected position. Only positions the expire before the selected expiry will be displayed, and only two positions can be rolled. If the user-defined max number of legs below is too small, it will be adjusted. Here, this feature cannot be used in conjunction with "Incorporate Existing Positions" feature.

Incorporate Existing Positions—The user may select the "Incorporate Existing Positions" feature to have existing positions in the underlying included in the computation used to build a strategy. Once the strategies are created, the system provides the user with the option of viewing the data for the strategies both with and without the selected existing positions being included by checking/unchecking the "Existing Positions" feature.

Delta Neutral—The user may select a "Delta Neutral" feature to only build (or only present) strategies that are delta neutral.

Include Stock Leg—The user may select a "Include Stock Leg" feature to have the underlying stock included as a leg in the returned strategies.

The Strategy Scanner panel displays three potential combination option strategies that complement the user's CPD. For each strategy (and based on the CPD), the selector displays the Expected Profit, Sharpe ratio (which shows the ratio of expected profit to variability of outcome), net debit or credit, percent likelihood of profit, max potential profit and loss and the associated probabilities, and the margin requirement to trade the strategy.

4. To create an order, the users selects the desired strategy (in the Strategy Scanner). To view color-coded representations in the Strategy Performance graph, the user checks the strategy.

Probability Basis—The user may choose the probability basis for calculations using a drop down selector (e.g., market implied or customized).

Existing Positions—If the user has elected to Include Existing Positions when building strategies, the user has the option to view data (including P&L in the performance details graph and data point in the strategy scanner) both including and excluding the existing positions in the underlying using the Existing Positions checkbox that will display next to the Probability Basis drop down list. Check to include; uncheck to exclude.

5. In the Strategy Adjustment/Order Entry panel, the user may adjust any one or more parts of the strategy by clicking in a field in the leg that the user desires to modify. For any leg, the user can modify the action, ratio, expiry, strike or type.

6. Once the legs are defined, the user uses the Order Entry line to modify any order parameters. The user can use the advanced order area to create a hedging stock order and to attach order attributes including iceberg and all or none.

7. When the order is ready to be sent, the user clicks the Submit button/input.

8. Use the Strategy Performance Detail graph to see the predicted profit or loss that would result from the selected trade if the forecast is accurate, along with the associated probability that corresponds to each price point. The user can use a drop down list to select Delta, Gamma, Vega, Theta or Rho for display.

While there have been shown and described fundamental novel features of the invention as applied to the illustrative embodiments thereof, it will be understood that omissions and substitutions and changes in the form and details of the disclosed embodiments of the invention may be made by those skilled in the art without departing from the spirit of the invention. In this regard, it should be understood that the embodiments are merely illustrative, and that the various features and implementations may be combined, interchanged and/or modified.

What is claimed is:

1. A computer-implemented method for electronic securities trading, the method comprising:
    receiving, from a user at a user computing device, a trading symbol of an underlying asset and a future date;
    receiving, from one or more electronic data providers, real time quotes for options on the underlying asset;
    computing, based on the options quotes, a market implied probability distribution for a future price of the underlying asset on the future date;
    providing a graphical user interface to the user at the user computing device, the graphical user interface including an interactive market implied probability distribution graph configured to display the market implied probability distribution and permit the user to customize it graphically, wherein ranges of prices for the underlying asset are displayed on an X-axis of the graph and probability per price range, in percentage terms, is displayed on a Y-axis of the graph and tracks movement of the user's cursor;
    receiving via the graphical user interface a user modification to a selected one of the displayed probabilities of the market implied probability distribution graph, whereby the user customizes the market implied probability distribution graph to reflect the user's own sentiment of the probability that the future price of the underlying asset will be in the selected price range by clicking a point on the market implied probability distribution graph in the selected price range and dragging the probability either up, to increase the probability that the price will fall within the selected price range, or down, to decrease the probability that the price will fall within the selected price range, thereby creating a user-customized probability distribution, wherein probabilities other than the user-modified probability are automatically adjusted to maintain a total probability of 1.0;
    generating one or more trading strategies based on the user-customized probability distribution, each trading strategy including one or more component trades;
    displaying the one or more trading strategies on the graphical user interface, including displaying at least one of expected profit based on the user-customized probability distribution, Sharpe ratio of expected profit based on the user-customized probability distribution to standard deviation of profit under the market implied probability distribution, percent likelihood of profit based on the user-customized probability distribution, maximum potential profit/loss based on the user-customized probability distribution, and probability of achieving the maximum potential profit/loss based on the user-customized probability distribution;
    receiving a selection of a strategy from the one or more trading strategies; and
    transmitting electronic orders to an electronic securities exchange for executing the one or more component trades of the selected strategy.

2. The method of claim 1, further comprising:
    receiving user input modifying one or more parameters of the selected strategy, wherein the electronic orders for the component trades reflect the modified parameters.

3. The method of claim 1, further comprising:
    receiving a user-specified number for the one or more component trades, wherein the one or more trading strategies are generated based on the user-customized probability distribution and the user-specified number of component trades.

4. The method of claim 1, wherein the interactive market implied probability distribution graph is a bar graph comprising a plurality of bars, each bar having a width defined by two strike prices, and a height representing the probability of the future price falling between the two strike prices, wherein the height of one or more bars is adjustable by the user.

5. The method of claim 3, wherein the user-specified number of component trades comprises a minimum number of component trades desired in a trading strategy.

6. The method of claim 1, further comprising:
    receiving user input modifying one or more order parameters.

7. The method of claim 1, further comprising:
    receiving user input for one or more order conditions.

8. A computer system for electronic securities trading, the system communicatively coupled to one or more user computers and one or more electronic marketplaces, the system comprising:
    one or more computer processors configured in accordance with programming on non-transient computer-readable memory, the programming configuring the one or more computer processors to perform a method according to claim 1.

9. The method of claim 1, wherein generating the one or more trading strategies includes:
    identifying best combinations of component trades by performing a number of permutations based on representative strike prices by (a) selecting a number of strike prices such that the number of permutations is below a threshold; (b) maintaining a list of the best combinations; and (c) refining each of the best combinations by replacing all strike prices in the combinations with strike prices within a range of the representative strike prices, thereby ensuring a reduced time to determine the best combinations.

10. The method of claim 9, wherein the best combinations are based on a ratio of potential profit to market price, maximizing profit while keeping maximum loss within a given range of underlying price constant, or maximizing profit by keeping the amount of collateral that needs to be posted constant.

11. The method of claim 1, wherein the options quotes are received via a real time data feed.

12. The method of claim 1, wherein computing the market implied probability distribution comprises (a) converting the options quotes into a set of implied volatilities, one per listed strike price; (b) smoothing the set of implied volatilities to reduce noise; and (c) converting the set of implied volatilities into a probability density function.

13. The method of claim 1, wherein the market implied probability distribution is recomputed in real time or periodically as the options quotes change.

14. The method of claim 1, further comprising trimming the market probability distribution to display probabilities for only a subset of strike prices.

15. The method of claim 14, wherein the subset is defined by a specified percentage probability or a specified number of standard deviations.

16. The method of claim 1, wherein in the user-customized probability distribution probabilities other than the user-modified probability are automatically adjusted to maintain a reasonable curve.

17. The method of claim 1, wherein the amount the user adjusts the probability of the selected price range is offset either proportionately or in equal amounts across the other price ranges having non-zero probabilities.

18. The method of claim 1, wherein the amount the user adjusts the probability of the selected price range is offset either proportionately or in equal amounts over a subset of the other price ranges.

19. The method of claim 1, wherein the user-customized probability distribution and the market implied probability distribution are displayed simultaneously.

* * * * *